(12) United States Patent
Tubel

(10) Patent No.: US 6,192,988 B1
(45) Date of Patent: *Feb. 27, 2001

(54) PRODUCTION WELL TELEMETRY SYSTEM AND METHOD

(75) Inventor: Paulo Tubel, The Woodlands, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 09/353,565

(22) Filed: Jul. 14, 1999

Related U.S. Application Data

(63) Continuation of application No. 08/717,975, filed on Sep. 23, 1996, now Pat. No. 5,941,307, which is a continuation-in-part of application No. 08/385,992, filed on Feb. 9, 1995, now Pat. No. 5,732,776.

(51) Int. Cl.$^7$ ............................. E21B 43/14; E21B 43/12
(52) U.S. Cl. ......................... 166/313; 166/50; 166/65.1; 340/853.7
(58) Field of Search ..................... 166/65.1, 50, 313, 166/53, 66.6, 66.7; 340/853.7, 854.6, 854.7, 855.8

(56) References Cited

U.S. PATENT DOCUMENTS

| | | |
|---|---|---|
| Re. 32,463 | 7/1987 | Westlake et al. . |
| Re. 33,690 | 9/1991 | Adams, Jr. et al. . |
| Re. 34,111 | 10/1992 | Wynn . |
| 3,186,222 * | 6/1965 | Martin ............................. 340/853.7 |

(List continued on next page.)

FOREIGN PATENT DOCUMENTS

| | | |
|---|---|---|
| 0 388 315 | 9/1990 | (EP) . |
| 924017 | 10/1992 | (NO) . |

*Primary Examiner*—Hoang Dang
(74) *Attorney, Agent, or Firm*—Cantor Colburn LLP

(57) ABSTRACT

A downhole production well control system is provided for automatically controlling downhole tools in response to sensed selected downhole parameters. The production well having a production tubing string therein with multiple branches, i.e., zones. Communication and transmission of power (i.e. telemetry) over the production tubing string is by way of a combination of a hardwire system in the main borehole and a short hop system at the branches or laterals. Each zone includes a downhole control system and appropriate completion devices for controlling fluid flow. An acoustic or electromagnetic transceiver is associated with each control system for communication and/or transmission of power. An electrical conductor runs from the surface downhole along the production tubing string in the main borehole for communication and/or transmission of power, hardwired systems are well known. The conductor is connected to an acoustic or electromagnetic transceiver disposed at the production tubing string in the main borehole near each branch. These transceivers communicate with and/or transfer power to corresponding transceivers at the branches (i.e., short hop communications), which is communicated and/or transferred along the production tubing string on the conductor (i.e., uphole or downhole).

20 Claims, 17 Drawing Sheets

U.S. PATENT DOCUMENTS

| | | |
|---|---|---|
| 3,219,107 | 11/1965 | Brown, Jr. et al. . |
| 3,357,490 | 12/1967 | Holmes . |
| 3,731,742 | 5/1973 | Sizer et al. . |
| 4,125,163 | 11/1978 | Fitzpatrick . |
| 4,150,721 | 4/1979 | Norwood . |
| 4,337,653 | 7/1982 | Chauffe . |
| 4,389,645 * | 6/1983 | Wharton .............................. 340/854.7 |
| 4,413,676 | 11/1983 | Kervin . |
| 4,578,675 * | 3/1986 | MacLeod ........................... 340/853.7 |
| 4,581,613 | 4/1986 | Ward et al. . |
| 4,616,700 | 10/1986 | Wood et al. . |
| 4,622,635 | 11/1986 | Chandra et al. . |
| 4,633,954 | 1/1987 | Dixon et al. . |
| 4,636,934 | 1/1987 | Schwendemann et al. . |
| 4,664,602 | 5/1987 | Gordon . |
| 4,684,947 * | 8/1987 | Zimmer ................................ 340/858 |
| 4,685,522 | 8/1987 | Dixon et al. . |
| 4,692,706 * | 9/1987 | Mazzagatti et al. .................. 324/338 |
| 4,712,613 | 12/1987 | Nieuwstad . |
| 4,757,314 | 7/1988 | Aubin et al. . |
| 4,788,545 | 11/1988 | Farque . |
| 4,790,380 | 12/1988 | Ireland et al. . |
| 4,796,699 | 1/1989 | Upchurch . |
| 4,856,595 | 8/1989 | Upchurch . |
| 4,886,126 | 12/1989 | Yates, Jr. . |
| 4,896,722 | 1/1990 | Upchurch . |
| 4,901,069 * | 2/1990 | Veneruso ............................. 166/66 X |
| 4,921,048 | 5/1990 | Crow et al. . |
| 4,922,423 | 5/1990 | Koomey et al. . |
| 4,971,160 | 11/1990 | Upchurch . |
| 4,989,671 | 2/1991 | Lamp . |
| 5,050,675 | 9/1991 | Upchurch . |
| 5,058,683 * | 10/1991 | Godfrey et al. ................. 166/65.1 X |
| 5,127,477 | 7/1992 | Schultz . |
| 5,132,904 | 7/1992 | Lamp . |
| 5,147,559 | 9/1992 | Brophey et al. . |
| 5,172,717 | 12/1992 | Boyle et al. . |
| 5,186,255 * | 2/1993 | Corey .................................. 166/50 X |
| 5,188,183 | 2/1993 | Hopmann et al. . |
| 5,191,937 | 3/1993 | Cook, Sr. . |
| 5,226,494 | 7/1993 | Rubbo et al. . |
| 5,234,057 | 8/1993 | Schultz et al. . |
| 5,260,660 | 11/1993 | Stolarczyk . |
| 5,265,677 | 11/1993 | Schultz . |
| 5,273,112 | 12/1993 | Schultz . |
| 5,273,113 | 12/1993 | Schultz . |
| 5,279,363 | 1/1994 | Schultz et al. . |
| 5,293,551 | 3/1994 | Perkins et al. . |
| 5,318,130 | 6/1994 | Manke . |
| 5,332,035 | 7/1994 | Schultz et al. . |
| 5,332,048 | 7/1994 | Underwood et al. . |
| 5,343,963 | 9/1994 | Bouldin et al. . |
| 5,353,873 | 10/1994 | Cooke, Jr. . |
| 5,358,035 | 10/1994 | Grudzinski . |
| 5,410,303 * | 4/1995 | Comeau et al. .................. 340/856.1 |
| 5,517,593 | 5/1996 | Nenniger et al. . |
| 5,531,270 | 6/1996 | Fletcher et al. . |
| 5,662,165 * | 9/1997 | Tubel et al. ..................... 166/250.01 |
| 5,721,538 * | 2/1998 | Tubel et al. ....................... 340/853.4 |
| 5,751,895 * | 5/1998 | Bridges ................................. 392/306 |
| 5,941,307 * | 8/1999 | Tubel .................................... 166/313 |
| 5,955,666 * | 9/1999 | Mullins ............................. 73/152.18 |
| B1 4,915,168 | 9/1994 | Upchurch . |

* cited by examiner

PRODUCTION WELL TELEMETRY SYSTEM AND METHOD

This is a continuation of application Ser. No. 08/717,975 filed Sep. 23, 1996, (now U.S. Pat. No. 5,941,307) which is a continuation-in-part of U.S. patent application Ser. No. 08/385,992 filed Feb. 9, 1995 (now U.S. Pat. No. 5,732,776).

BACKGROUND OF THE INVENTION

1. Field of the Invention

This invention relates generally to a method and apparatus for the control of oil and gas production wells. More particularly, this invention relates to a method and apparatus for automatically controlling petroleum production wells using downhole computerized control systems. This invention also relates to a control system for controlling production wells, including multiple zones within a single well, from a remote location.

2. The Prior Art

The control of oil and gas production wells constitutes an on-going concern of the petroleum industry due, in part, to the enormous monetary expense involved as well as the risks associated with environmental and safety issues.

Production well control has become particularly important and more complex in view of the industry wide recognition that wells having multiple branches (i.e., multilateral wells) will be increasingly important and commonplace. Such multilateral wells include discrete production zones which produce fluid in either common or discrete production tubing. In either case, there is a need for controlling zone production, isolating specific zones and otherwise monitoring each zone in a particular well.

Before describing the current state-of-the-art relative to such production well control systems and methods, a brief description will be made of the production systems, per se, in need of control. One type of production system utilizes electrical submersible pumps (ESP) for pumping fluids from downhole. In addition, there are two other general types of productions systems for oil and gas wells, namely plunger lift and gas lift. Plunger lift production systems include the use of a small cylindrical plunger which travels through tubing extending from a location adjacent the producing formation down in the borehole to surface equipment located at the open end of the borehole. In general, fluids which collect in the borehole and inhibit the flow of fluids out of the formation and into the wellbore, are collected in the tubing. Periodically, the end of the tubing is opened at the surface and the accumulated reservoir pressure is sufficient to force the plunger up the tubing. The plunger carries with it to the surface a load of accumulated fluids which are ejected out the top of the well thereby allowing gas to flow more freely from the formation into the wellbore and be delivered to a distribution system at the surface. After the flow of gas has again become restricted due to the further accumulation of fluids downhole, a valve in the tubing at the surface of the well is closed so that the plunger then falls back down the tubing and is ready to lift another load of fluids to the surface upon the reopening of the valve.

A gas lift production system includes a valve system for controlling the injection of pressurized gas from a source external to the well, such as another gas well or a compressor, into the borehole. The increased pressure from the injected gas forces accumulated formation fluids up a central tubing extending along the borehole to remove the fluids and restore the free flow of gas and/or oil from the formation into the well. In wells where liquid fall back is a problem during gas lift, plunger lift may be combined with gas lift to improve efficiency.

In both plunger lift and gas lift production systems, there is a requirement for the periodic operation of a motor valve at the surface of the wellhead to control either the flow of fluids from the well or the flow of injection gas into the well to assist in the production of gas and liquids from the well. These motor valves are conventionally controlled by timing mechanisms and are programmed in accordance with principles of reservoir engineering which determine the length of time that a well should be either "shut in" and restricted from the flowing of gas or liquids to the surface and the time the well should be "opened" to freely produce. Generally, the criteria used for operation of the motor valve is strictly one of the elapse of a preselected time period. In most cases, measured well parameters, such as pressure, temperature, etc. are used only to override the timing cycle in special conditions.

It will be appreciated that relatively simple, timed intermittent operation of motor valves and the like is often not adequate to control either outflow from the well or gas injection to the well so as to optimize well production. As a consequence, sophisticated computerized controllers have been positioned at the surface of production wells for control of downhole devices such as the motor valves.

In addition, such computerized controllers have been used to control other downhole devices such as hydro-mechanical safety valves. These typically microprocessor based controllers are also used for zone control within a well and, for example, can be used to actuate sliding sleeves or packers by the transmission of a surface command to downhole microprocessor controllers and/or electromechanical control devices.

The surface controllers are often hardwired to downhole sensors which transmit information to the surface such as pressure, temperature and flow. This data is then processed at the surface by the computerized control system. Electrically submersible pumps use pressure and temperature readings received at the surface from downhole sensors to change the speed of the pump in the borehole. As an alternative to downhole sensors, wire line production logging tools are also used to provide downhole data on pressure, temperature, flow, gamma ray and pulse neutron using a wire line surface unit. This data is then used for control of the production well.

There are numerous prior art patents related to the control of oil and gas production wells. In general, these prior patents relate to (1) surface control systems using a surface microprocessor and (2) downhole control systems which are initiated by surface control signals.

The surface control system patents generally disclose computerized systems for monitoring and controlling a gas/oil production well whereby the control electronics is located at the surface and communicates with sensors and electromechanical devices near the surface. An example of a system of this type is described in U.S. Pat. No. 4,633,954 ('954) to Dixon et al. The system described in the '954 patent includes a fully programmable microprocessor controller which monitors downhole parameters such as pressure and flow and controls the operation of gas injection to the well, outflow of fluids from the well or shutting in of the well to maximize output of the well. This particular system includes battery powered solid state circuitry comprising a keyboard, a programmable memory, a microprocessor, control circuitry and a liquid crystal display. Another example of a control system of this type is described in U.S. Pat. No. 5,132,904 ('904) to Lamp. The '904 patent discloses a system similar to the '954 patent and in addition also describes a feature wherein the controller includes serial and parallel communication ports through which all communications to and from the controller pass. Hand held devices or portable computers capable of serial communication may access the controller. A telephone modem or telemetry link to a central host computer may also be used to permit several controllers to be accessed remotely.

U.S. Pat. No. 4,757,314 ('314) to Aubin et al describes an apparatus for controlling and monitoring a well head submerged in water. This system includes a plurality of sensors, a plurality of electromechanical valves and an electronic control system which communicates with the sensors and valves. The electronic control system is positioned in a water tight enclosure and the water tight enclosure is submerged underwater. The electronics located in the submerged enclosure control and operate the electromechanical valves based on input from the sensors. In particular, the electronics in the enclosure uses the decision making abilities of the microprocessor to monitor the cable integrity from the surface to the well head to automatically open or close the valves should a break in the line occur.

The downhole control system patents generally disclose downhole microprocessor controllers, electromechanical control devices and sensors. Examples include U.S. Pat. Nos. 4,915,168 ('168) to Upchurch and 5,273,112 ('112) to Schultz. However, in each and every case, the microprocessor controllers transmit control signals only upon actuation from a surface or other external control signal. There is no teaching in any of these patents that the downhole microprocessor controllers themselves may automatically initiate the control of the electromechanical devices based on pre-programmed instructions. Similarly, none of the aforementioned patents directed to microprocessor based control systems for controlling the production from oil and gas wells, including the aforementioned '954, '904 and '314 patents, disclose the use of downhole electronic controllers, electromechanical control devices and sensors whereby the electronic control units will automatically control the electromechanical devices based on input from the sensor without the need for a surface or other external control signal.

It will be appreciated that the downhole control system of the types disclosed in the '168 and '112 patents are closely analogous to the surface based control systems such as disclosed in the '954, '904 and '314 patents in that a surface controller is required at each well to initiate and transmit the control instructions to the downhole microprocessor. Thus, in all cases, some type of surface controller and associated support platform at each well is needed.

While it is well recognized that petroleum production wells will have increased production efficiencies and lower operating costs if surface computer based controllers and downhole microprocessor controller (actuated by external or surface signals) of the type discussed hereinabove are used, the presently implemented control systems nevertheless suffer from drawbacks and disadvantages. For example, as mentioned, all of these prior art systems generally require a surface platform at each well for supporting the control electronics and associated equipment. However, in many instances, the well operator would rather forego building and maintaining the costly platform. Thus, a problem is encountered in that use of present surface controllers require the presence of a location for the control system, namely the platform. Still another problem associated with known surface control systems such as the type disclosed in the '168 and '112 patents wherein a downhole microprocessor is actuated by a surface signal is the reliability of surface to downhole signal integrity. It will be appreciated that should the surface signal be in any way compromised on its way downhole, then important control operations (such as preventing water from flowing into the production tubing) will not take place as needed.

In multilateral wells where multiple zones are controlled by a single surface control system, an inherent risk is that if the surface control system fails or otherwise shuts down, then all of the downhole tools and other production equipment in each separate zone will similarly shut down leading to a large loss in production and, of course, a loss in revenue.

Still another significant drawback of present production well control systems involves the extremely high cost associated with implementing changes in well control and related workover operations. Presently, if a problem is detected at the well, the customer is required to send a rig to the well site at an extremely high cost (e.g., 5 million dollars for 30 days of offshore work). The well must then be shut in during the workover causing a large loss in revenues (e.g., 1.5 million dollars for a 30 day period). Associated with these high costs are the relatively high risks of adverse environmental impact due to spills and other accidents as well as potential liability of personnel at the rig site. Of course, these risks can lead to even further costs. Because of the high costs and risks involved, in general, a customer may delay important and necessary workover of a single well until other wells in that area encounter problems. This delay may cause the production of the well to decrease or be shut in until the rig is brought in.

Still other problems associated with present production well control systems involve the need for wireline formation evaluation to sense changes in the formation and fluid composition. Unfortunately, such wireline formation evaluation is extremely expensive and time consuming. In addition, it requires shut-in of the well and does not provide "real time" information. The need for real time information regarding the formation and fluid is especially acute in evaluating undesirable water flow into the production fluids.

U.S. Pat. No. 5,531,270 discloses remotely controllable fluid flow control valves disposed in the main wellbore and branch wellbores of a multiple well. Each flow control valve has a radio frequency range receiver, a controller and an actuator for moving a closure member to a selected position to control fluid flow in the wellbore in which the valve is disposed. A signal transmitter is conveyed into the main wellbore by a line or coilable tubing and radio frequency range electromagnetic wave energy signals are transmitted to the selected valve to effect fluid flow control within each wellbore of the multiple well.

However, fluid flow conditions for a particular wellbore can only be monitored when the transmitter is placed in proximity to the fluid flow control valve to be controlled. This wireline (or coil tubing) device suffers from the same aforementioned problem and deficiencies of other wireline devices.

SUMMARY OF THE INVENTION

The above-discussed and other problems and deficiencies of the prior art are overcome or alleviated by the production well control system of the present invention. In accordance with the present invention, a downhole production well control system is provided for automatically controlling downhole tools in response to sensed selected downhole parameters. An important feature of this invention is that the automatic control is initiated downhole without an initial control signal from the surface or from some other external source.

The present invention generally comprises downhole sensors, downhole electromechanical devices and downhole computerized control electronics whereby the control electronics automatically control the electromechanical devices based on input from the downhole sensors. Thus, using the downhole sensors, the downhole computerized control system will monitor actual downhole parameters (such as pressure, temperature, flow, gas influx, etc.) and automatically execute control instructions when the monitored downhole parameters are outside a selected operating range (e.g., indicating an unsafe condition). The automatic control instructions will then cause an electromechanical control device (such as a valve) to actuate a suitable tool (for example, actuate a sliding sleeve or packer; or close a pump or other fluid flow device).

The downhole control system of this invention also includes transceivers for two-way communication with the surface as well as a telemetry device for communicating from the surface of the production well to a remote location.

The downhole control system is preferably located in each zone of a well such that a plurality of wells associated with one or more platforms will have a plurality of downhole control systems, one for each zone in each well. The downhole control systems have the ability to communicate with other downhole control systems in other zones in the same or different wells. In addition, as discussed in more detail hereinafter, each downhole control system in a zone may also communicate with a surface control system. The downhole control system of this invention thus is extremely well suited for use in connection with multilateral wells which include multiple zones.

The selected operating range for each tool controlled by the downhole control system of this invention is programmed in a downhole memory either before or after the control system is lowered downhole. The aforementioned transceiver may be used to change the operating range or alter the programming of the control system from the surface of the well or from a remote location.

A power source provides energy to the downhole control system. Power for the power source can be generated in the borehole (e.g., by a turbine generator), at the surface or be supplied by energy storage devices such as batteries (or a combination of one or more of these power sources). The power source provides electrical voltage and current to the downhole electronics, electromechanical devices and sensors in the borehole.

In contrast to the aforementioned prior art well control systems which consist either of computer systems located wholly at the surface or downhole computer systems which require an external (e.g., surface) initiation signal (as well as a surface control system), the downhole well production control system of this invention automatically operates based on downhole conditions sensed in real time without the need for a surface or other external signal. This important feature constitutes a significant advance in the field of production well control. For example, use of the downhole control system of this invention obviates the need for a surface platform (although such surface platforms may still be desirable in certain applications such as when a remote monitoring and control facility is desired as discussed below). The downhole control system of this invention is also inherently more reliable since no surface to downhole actuation signal is required and the associated risk that such an actuation signal will be compromised is therefore rendered moot. With regard to multilateral (i.e., multi-zone) wells, still another advantage of this invention is that, because the entire production well and its multiple zones are not controlled by a single surface controller, then the risk that an entire well including all of its discrete production zones will be shut-in simultaneously is greatly reduced.

Further, a system adapted for controlling and/or monitoring a plurality of production wells from a remote location is provided. This system is capable of controlling and/or monitoring:

(1) a plurality of zones in a single production well;
  (2) a plurality of zones/wells in a single location (e.g., a single platform); or
  (3) a plurality of zones/wells located at a plurality of locations (e.g., multiple platforms).

The multizone and/or multiwell control system of this invention is composed of multiple downhole electronically controlled electromechanical devices (sometimes referred to as downhole modules), and multiple computer based surface systems operated from multiple locations. Important functions for these systems include the ability to predict the future flow profile of multiple wells and to monitor and control the fluid or gas flow from either the formation into the wellbore, or from the wellbore to the surface. The control system of this invention is also capable of receiving and transmitting data from multiple remote locations such as inside the borehole, to or from other platforms, or from a location away from any well site.

The downhole control devices interface to the surface system using either a wireless communication system or through an electrical hard wired connection. The downhole control systems in the wellbore can transmit and receive data and/or commands to/from the surface system. The data transmission from inside the wellbore can be done by allowing the surface system to poll each individual device in the hole, although individual devices will be allowed to take control of the communications during an emergency. The devices downhole may be programmed while in the wellbore by sending the proper command and data to adjust the parameters being monitored due to changes in borehole and flow conditions and/or to change its primary function in the wellbore.

The surface system may control the activities of the downhole modules by requesting data on a periodic basis, and commanding the modules to open or close the electromechanical control devices, and/or change monitoring parameters due to changes in long term borehole conditions. The surface system at one location will be capable of interfacing with a system in another location via phone lines, satellite communication or other communicating means. Preferably, a remote central control system controls and/or monitors all of the zones, wells and/or platforms from a single remote location.

In accordance with another embodiment of the present invention, the downhole control systems are associated with permanent downhole formation evaluation sensors which remain downhole throughout production operations. These formation evaluation sensors for formation measurements may include, for example, gamma ray detection for formation evaluation, neutron porosity, resistivity, acoustic sensors and pulse neutron which can, in real time, sense and evaluate formation parameters including important information regarding water migrating from different zones. Significantly, this information can be obtained prior to the water actually entering the producing tubing and therefore corrective action (i.e., closing of a valve or sliding sleeve) or formation treatment can be taken prior to water being produced. This real time acquisition of formation data in the production well constitutes an important advance over current wireline techniques in that the present invention is far less costly and can anticipate and react to potential problems before they occur. In addition, the formation evaluation sensors themselves can be placed much closer to the actual formation (i.e., adjacent the casing or downhole completion tool) then wireline devices which are restricted to the interior of the production tubing.

In accordance with the present invention, a completed well having a production tubing string therein with multiple branches, i.e., zones, communicates and transmitts power over a combination of a hardwire system in the main borehole and a short hop system in the branches or laterals. The production tubing string in the main borehole includes packers located uphole and downhole from each of the zones. Each zone includes a downhole control system and appropriate completion devices for controling fluid flow.

An acoustic or electromagnetic transciever is associated with each control system for communication and/or transmission of power. An electrical conductor runs from the surface downhole along the production tubing string in the main borehole for communication and/or transmission of power, hardwired systems are well known. The conductor is connected to an acoustic or electromagnetic transceiver disposed at the production tubing string in the main borehole near each branch. These transceivers communicate with and/or transfer power to corresponding transceivers at the branches (i.e., short hop communications), which is communicated and/or transferred along the production tubing string on the conductor (i.e., uphole or downhole).

With acoustic transceivers (transmitter and/or receiver) acoustic or seismic signals travel through the production string or the earth. With electromagnetic transceivers (transmitter and/or receiver) electromagnetic ("EM") waves through the production string and the earth. Typically, a pickup assembly or loop antenna (e.g. a toriod) is located around the production tubing string. These signals are only required to travel a short distance, whereby the large power requirement systems designed for transmission over long distances (several thousand feet) are not required.

Communication and/or transmission of power along the laterals can be accomplished, by way of, a hardwire, acoustic transmission, electromagnetic transmission or any other suitable method.

The above-discussed and other features and advantages of the present invention will be appreciated by and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

This invention relates to a system for controlling production wells from a remote location. In particular, in an embodiment of the present invention, a control and monitoring system is described for controlling and/or monitoring at least two zones in a single well from a remote location. The present invention also includes the remote control and/or monitoring of multiple wells at a single platform (or other location) and/or multiple wells located at multiple platforms or locations. Thus, the control system of the present invention has the ability to control individual zones in multiple wells on multiple platforms, all from a remote location. The control and/or monitoring system of this invention is comprised of a plurality of surface control systems or modules located at each well head and one or more downhole control systems or modules positioned within zones located in each well. These subsystems allow monitoring and control from a single remote location of activities in different zones in a number of wells in near real time.

Figure 6:
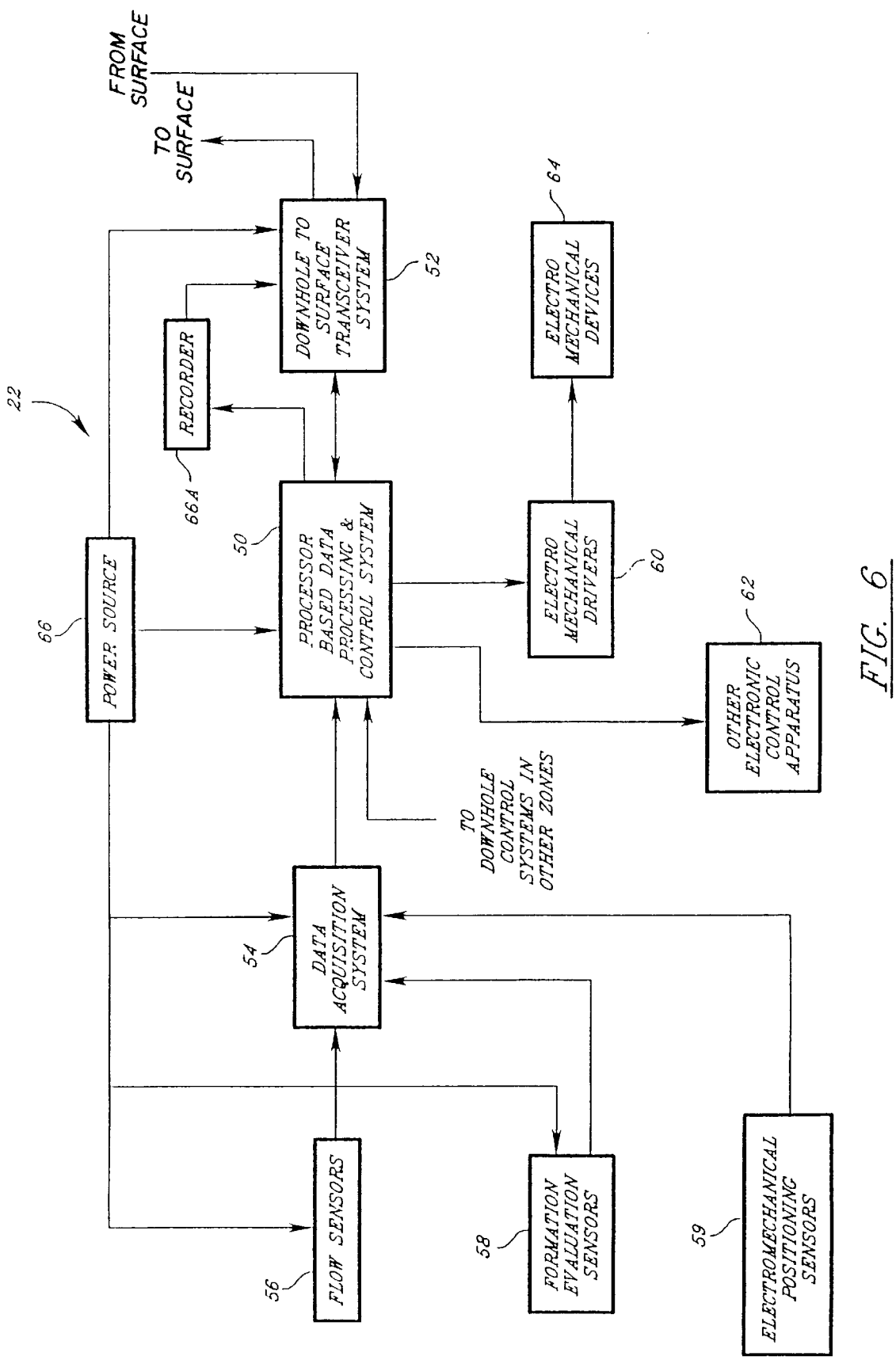
FIG. 6 is a block diagram depicting a downhole production well control system in accordance with the present invention.

As will be discussed in some detail hereinafter in connection with FIGS. 2, 6 and 7, in accordance with the present invention, the downhole control system is composed of downhole sensors, downhole control electronics and downhole electromechanical modules that can be placed in different locations (e.g., zones) in a well, with each downhole control system having a unique electronics address. A number of wells can be outfitted with these downhole control devices. The surface control and monitoring system interfaces with all of the wells where the downhole control devices are located to poll each device for data related to the status of the downhole sensors attached to the module being polled. In general, the surface system allows the operator to control the position, status, and/or fluid flow in each zone of the well by sending a command to the device being controlled in the wellbore.

As will be discussed hereinafter, the downhole control modules for use in the multizone or multiwell control system of this invention may either be controlled using an external or surface command as is known in the art or the downhole control system may be actuated automatically in accordance with a novel control system which controls the activities in the wellbore by monitoring the well sensors connected to the data acquisition electronics. In the latter case, a downhole computer (e.g., microprocessor) will command a downhole tool such as a packer, sliding sleeve or valve to open, close, change state or do whatever other action is required if certain sensed parameters are outside the normal or preselected well zone operating range. This operating range may be programmed into the system either prior to being placed in the borehole or such programming may be effected by a command from the surface after the downhole control module has been positioned downhole in the wellbore.

Figure 1:
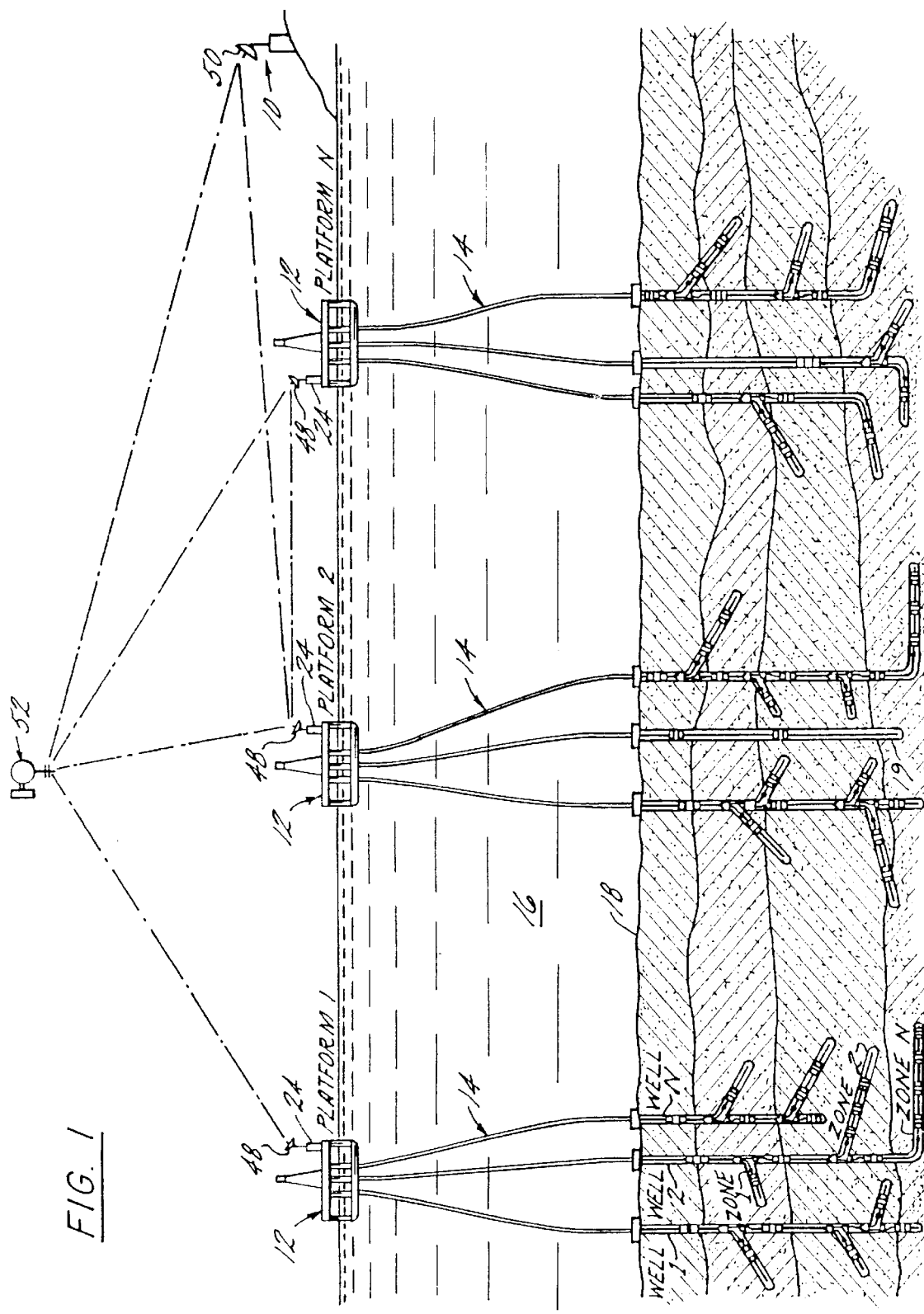
FIG. 1 is a diagrammatic view depicting the multiwell/multizone control system of the present invention for use in controlling a plurality of offshore well platforms.
Figure 4:
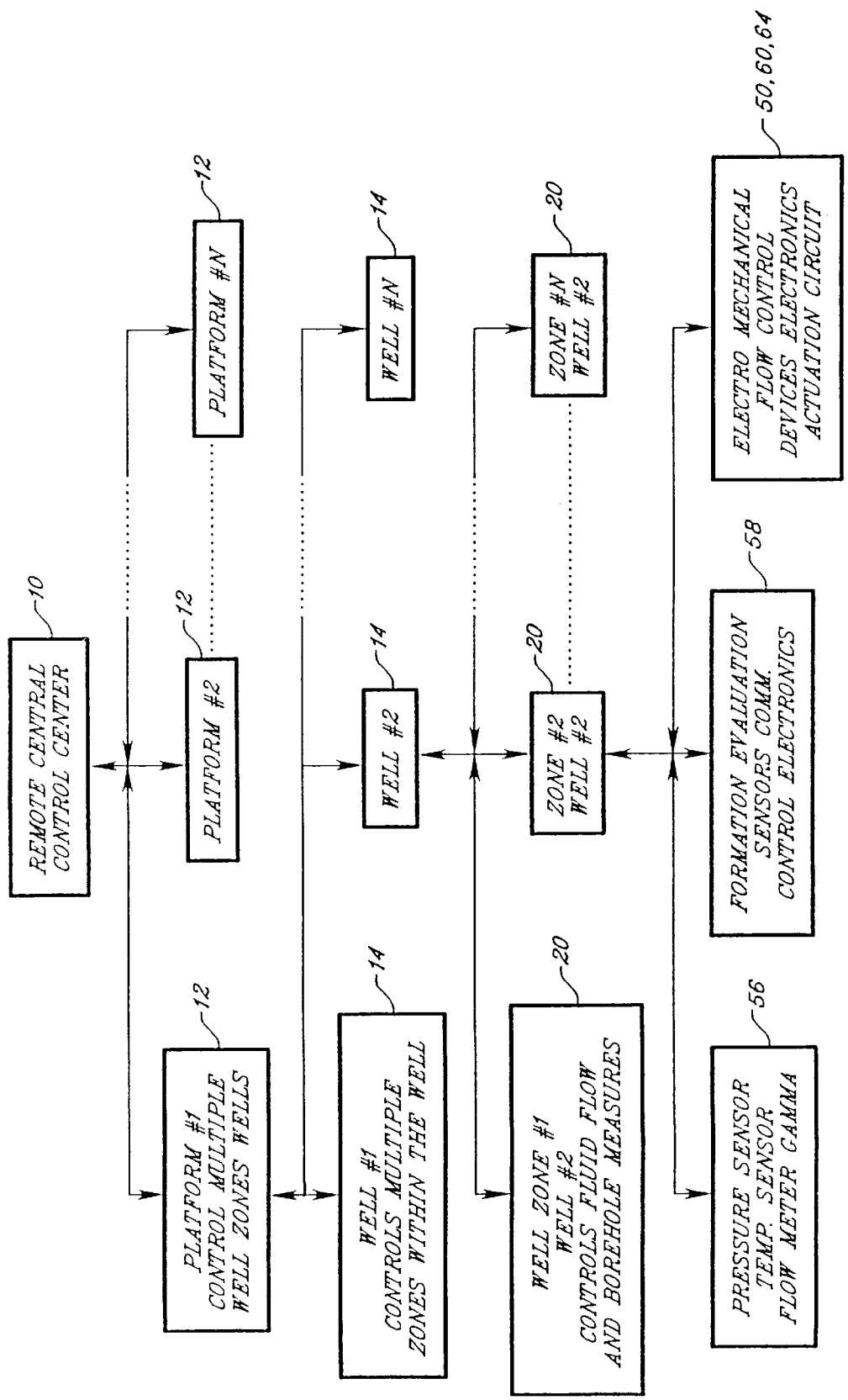
FIG. 4 is a block diagram depicting the multiwell/multizone control system in accordance with the present invention.

Referring now to FIGS. 1 and 4, the multiwell/multizone monitoring and control system of the present invention may include a remote central control center 10 which communicates either wirelessly or via telephone wires to a plurality of well platforms 12. It will be appreciated that any number of well platforms may be encompassed by the control system of the present invention with three platforms namely, platform 1, platform 2, and platform N being shown in FIGS. 1 and 4. Each well platform has associated therewith a plurality of wells 14 which extend from each platform 12 through water 16 to the surface of the ocean floor 18 and then downwardly into formations under the ocean floor. It will be appreciated that while offshore platforms 12 have been shown in FIG. 1, the group of wells 14 associated with each platform are analogous to groups of wells positioned together in an area of land; and the present invention therefore is also well suited for control of land based wells.

As mentioned, each platform 12 is associated with a plurality of wells 14. For purposes of illustration, three wells are depicted as being associated with platform number 1 with each well being identified as well number 1, well number 2 and well number N. As is known, a given well may be divided into a plurality of separate zones which are required to isolate specific areas of a well for purposes of producing selected fluids, preventing blowouts and preventing water intake. Such zones may be positioned in a single vertical well such as well 19 associated with platform 2 shown in FIG. 1 or such zones can result when multiple wells are linked or otherwise joined together. A particularly significant contemporary feature of well production is the drilling and completion of lateral or branch wells which extend from a particular primary wellbore. These lateral or branch wells can be completed such that each lateral well constitutes a separable zone and can be isolated for selected production. A more complete description of well bores containing one or more laterals (known as multilaterals) can be found in U.S. Pat. Nos. 4,807,407, 5,325,924 and U.S. application Ser. No. 08/187,277 (now U.S. Pat. No. 5,411, 082), all of the contents of each of those patents and applications being incorporated herein by reference.

With reference to FIGS. 1–4, each of the wells 1, 2 and 3 associated with platform 1 include a plurality of zones which need to be monitored and/or controlled for efficient production and management of the well fluids. For example, with reference to FIG. 2, well number 2 includes three zones, namely zone number 1, zone number 2 and zone number N. Each of zones 1, 2 and N have been completed in a known manner; and more particularly have been completed in the manner disclosed in aforementioned application Ser. No. 08/187,277. Zone number 1 has been completed using a known slotted liner completion, zone number 2 has been completed using an open hole selective completion and zone number N has been completed using a cased hole selective completion with sliding sleeves. Associated with each of zones 1, 2 and N is a downhole control system 22. Similarly, associated with each well platform 1, 2 and N is a surface control system 24.

As discussed, the multiwell/multizone control system of the present invention is comprised of multiple downhole electronically controlled electromechanical devices and multiple computer based surface systems operated form multiple locations. An important function of these systems is to predict the future flow profile of multiple wells and monitor and control the fluid or gas flow from the formation into the wellbore and from the wellbore into the surface. The system is also capable of receiving and transmitting data from multiple locations such as inside the borehole, and to or from other platforms 1, 2 or N or from a location away from any well site such as central control center 10.

Figure 5:
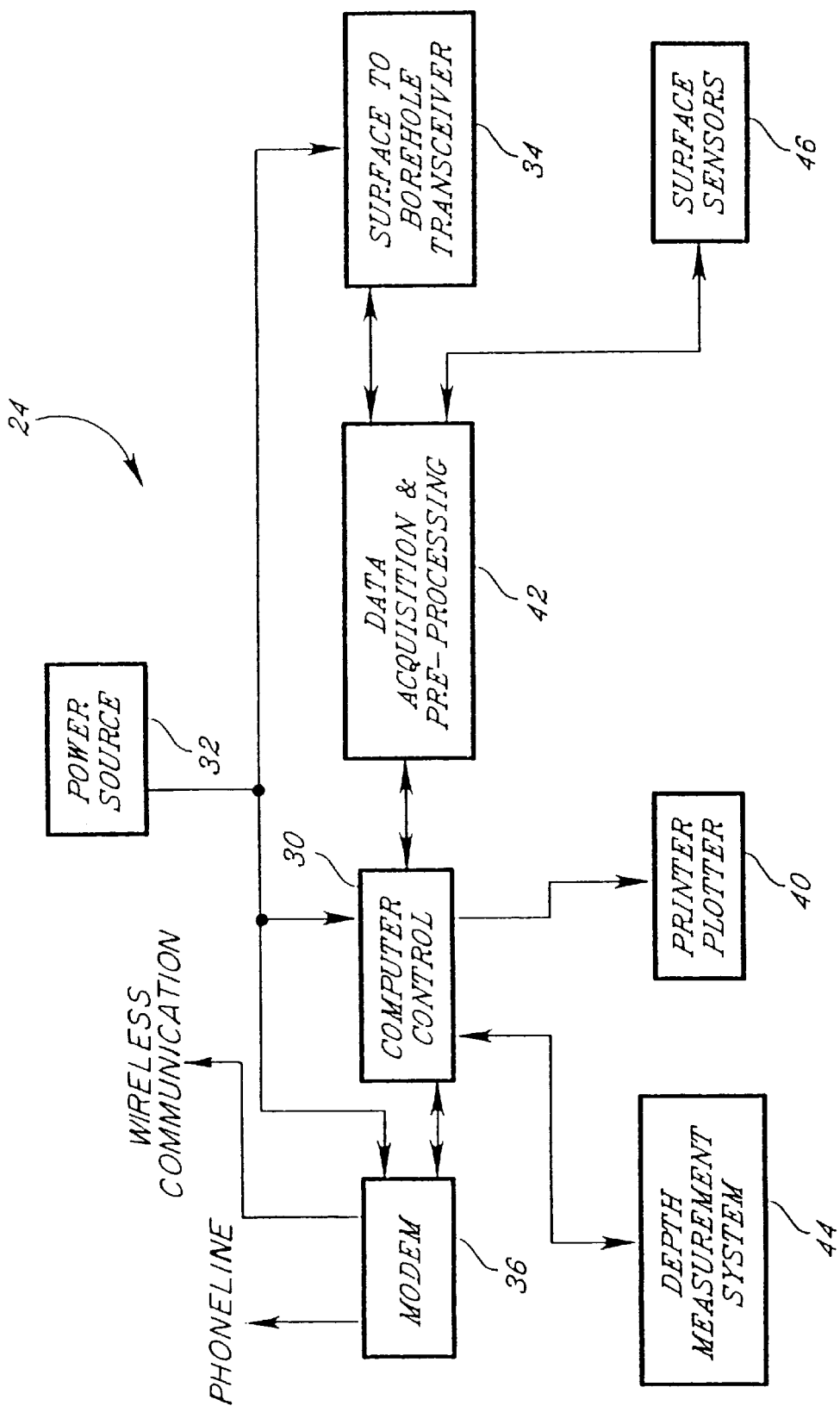
FIG. 5 is a block diagram depicting a surface control system for use with the multiwell/multizone control system of the present invention.

The downhole control systems 22 will interface to the surface system 24 using a wireless communication system or through an electrical wire (i.e., hardwired) connection. The downhole systems in the wellbore can transmit and receive data and/or commands to or from the surface and/or to or from other devices in the borehole. Referring now to FIG. 5, the surface system 24 is composed of a computer system 30 used for processing, storing and displaying the information acquired downhole and interfacing with the operator. Computer system 30 may be comprised of a personal computer or a work station with a processor board, short term and long term storage media, video and sound capabilities as is well know. Computer control 30 is powered by power source 32 for providing energy necessary to operate the surface system 24 as well as any downhole system 22 if the interface is accomplished using a wire or cable. Power will be regulated and converted to the appropriate values required to operate any surface sensors (as well as a downhole system if a wire connection between surface and downhole is available).

A surface to borehole transceiver 34 is used for sending data downhole and for receiving the information transmitted from inside the wellbore to the surface. The transceiver converts the pulses received from downhole into signals compatible with the surface computer system and converts signals from the computer 30 to an appropriate communications means for communicating downhole to downhole control system 22. Communications downhole may be effected by a variety of known methods including hardwiring and wireless communications techniques. A preferred technique transmits acoustic signals down a tubing string such as production tubing string 38 (see FIG. 2) or coiled tubing. Acoustical communication may include variations of signal frequencies, specific frequencies, or codes or acoustical signals or combinations of these. The acoustical transmission media may include the tubing string as illustrated in U.S. Pat. Nos. 4,375,239; 4,347,900 or 4,378,850, all of which are incorporated herein by reference. Alternatively, the acoustical transmission may be transmitted through the casing stream, electrical line, slick line, subterranean soil around the well, tubing fluid or annulus fluid. A preferred acoustic transmitter is described in U.S. Pat. No. 5,222,049, all of the contents of which is incorporated herein by reference thereto, which discloses a ceramic piezoelectric based transceiver. The piezoelectric wafers that compose the transducer are stacked and compressed for proper coupling to the medium used to carry the data information to the sensors in the borehole. This transducer will generate a mechanical force when alternating current voltage is applied to the two power inputs of the transducer. The signal generated by stressing the piezoelectric wafers will travel along the axis of the borehole to the receivers located in the tool assembly where the signal is detected and processed. An alternative to piezoelectric elements is magnetostrictive elements. The transmission medium where the acoustic signal will travel in the borehole can be production tubing or coil tubing.

Communications can also be effected by sensed downhole pressure conditions which may be natural conditions or which may be a coded pressure pulse or the like introduced into the well at the surface by the operator of the well. Suitable systems describing in more detail the nature of such coded pressure pulses are described in U.S. Pat. Nos. 4,712,613 to Nieuwstad, 4,468,665 to Thawley, 3,233,674 to Leutwyler and 4,078,620 to Westlake; 5,226,494 to Rubbo et al and 5,343,963 to Bouldin et al. Similarly, the aforementioned '168 patent to Upchurch and '112 patent to Schultz also disclose the use of coded pressure pulses in communicating from the surface downhole.

Figure 5A:
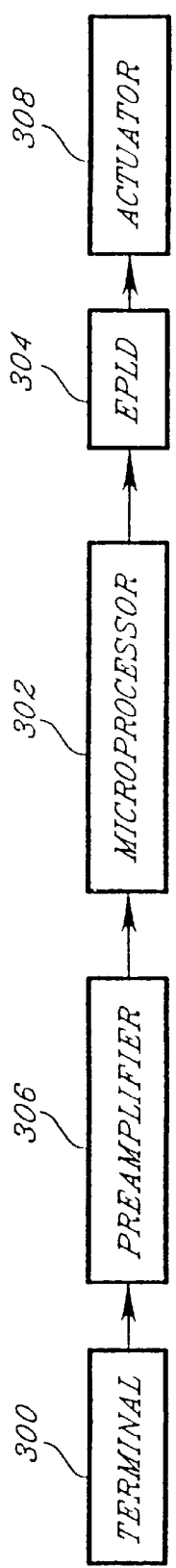
FIG. 5A is a block diagram of a communications system using sensed downhole pressure conditions.
Figure 5B:
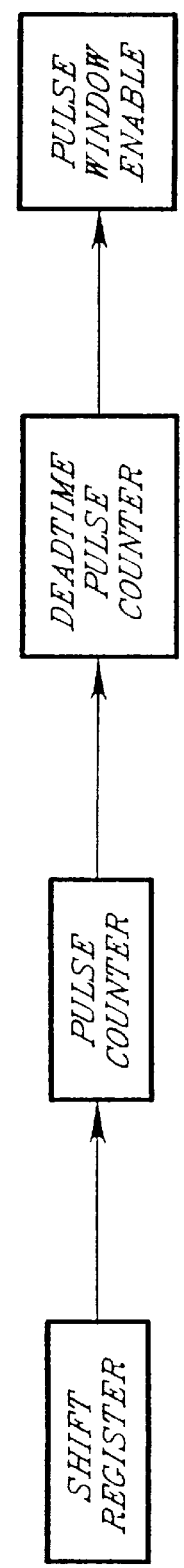
FIG. 5B is a block diagram of a portion of the communications system of FIG. 5A.

A preferred system for sensing downhole pressure conditions is depicted in FIGS. 5A and 5B. Referring to FIG. 5A, this system includes a handheld terminal 300 used for programming the tool at the surface, batteries (not shown) for powering the electronics and actuation downhole, a microprocessor 302 used for interfacing with the handheld terminal and for setting the frequencies to be used by the Erasable Programmable Logic Device (EPLD) 304 for activation of the drivers, preamplifiers 306 used for conditioning the pulses from the surface, counters (EPLD) 304 used for the acquisition of the pulses transmitted from the surface for determination of the pulse frequencies, and to enable the actuators 306 in the tool; and actuators 308 used for the control and operation of electromechanical devices and/or ignitors.

Referring to FIG. 5B, the EPLD system 304 is preferably comprised of six counters: A four bit counter for surface pulse count and for control of the actuation of the electromechanical devices. A 10 bit counter to reduce the frequency of Clock in from 32.768 KHz to 32 Hz; and a 10 bit counter to count the dead time frequency. Two counters are used to determine the proper frequency of pulses. Only one frequency counter is enabled at any time. A shift register is set by the processor to retain the frequency settings. The 10 bit devices also enable the pulse counter to increment the count if a pulse is received after the dead time elapse, and before the pulse window count of six seconds expire. The system will be reset if a pulse is not received during the six seconds valid period. An AND gate is located between the input pulses and the clock in the pulse counter. The AND gate will allow the pulse from a strain gauge to reach the counter if the enable line from the 10 bit counter is low. A two input OR gate will reset the pulse counter from the 10 bit counter or the master reset from the processor. A three input OR gate will be used for resetting the 11, 10 bit counters, as well as the frequency counters.

The communications system of of FIGS. 5A and 5B may operate as follows:

1. Set the tool address (frequencies) using the handheld terminal at the surface;
2. Use the handheld terminal to also set the time delay for the tool to turn itself on and listen to the pulses transmitted from the surface;
3. The processor 302 will set the shift register with a binary number which will indicate to the counters the frequencies (address) it should acknowledge for operation of the actuators;
4. The operator will use an appropriate transmitter at the surface system 24 to generate the proper frequencies to be sent to the tool downhole;
5. The downhole electronics 22 will receive the pulses from the surface, determine if they are valid, and turn on or off the actuators;
6. In one preferred embodiment described in steps 6–8, there are a total of sixteen different frequencies that can be used to activate the systems downhole. Each downhole system will require two frequencies to be sent from the surface for proper activation.
7. The surface system 24 will interface to the tools' processor 302 to set the two frequencies for communication and activation of the systems in the borehole. Each frequency spaced at multiples of 30 seconds intervals is composed of four pulses. A system downhole will be activated when 8 pulses at the two preset frequencies are received by the electronics in the tool. There has to be 4 pulses at one frequency followed by 4 pulses at a second frequency.
8. A counter will monitor the frequencies downhole and will reset the hardware if a pulse is not received within a 6 second window.

Also, other suitable communications techniques include radio transmission from the surface location or from a subsurface location, with corresponding radio feedback from the downhole tools to the surface location or subsurface location; the use of microwave transmission and reception; the use of fiber optic communications through a fiber optic cable suspended from the surface to the downhole control package; the use of electrical signaling from a wire line suspended transmitter to the downhole control package with subsequent feedback from the control package to the wire line suspended transmitter/receiver. Communication may also consist of frequencies, amplitudes, codes or variations or combinations of these parameters or a transformer coupled technique which involves wire line conveyance of a partial transformer to a downhole tool. Either the primary or secondary of the transformer is conveyed on a wire line with the other half of the transformer residing within the downhole tool. When the two portions of the transformer are mated, data can be interchanged.

Figure 5C:
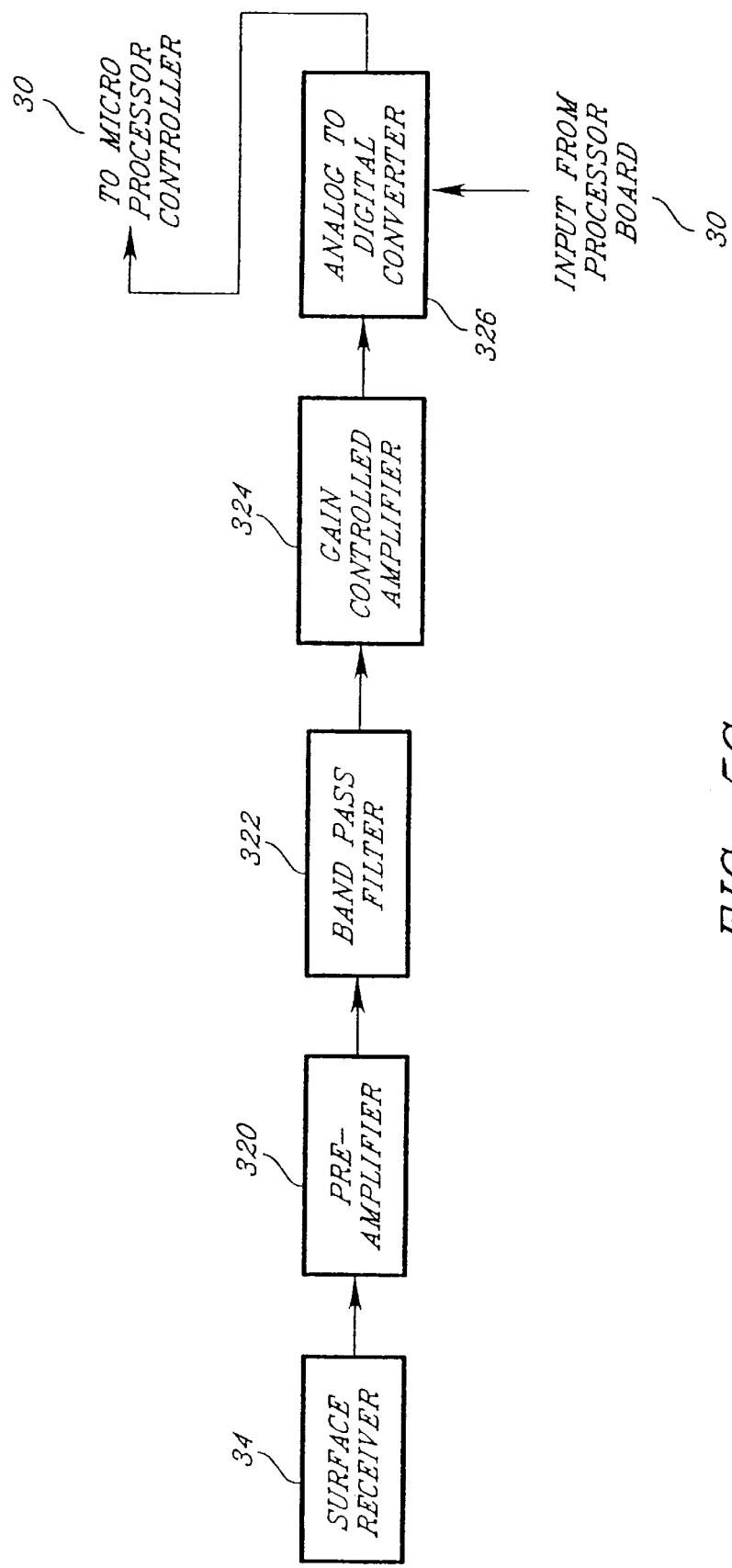
FIG. 5C is a block diagram of the data acquisition system used in the surface control system of FIG. 5.

Referring again to FIG. 5, the control surface system 24 further includes a printer/plotter 40 which is used to create a paper record of the events occurring in the well. The hard copy generated by computer 30 can be used to compare the status of different wells, compare previous events to events occurring in existing wells and to get formation evaluation logs. Also communicating with computer control 30 is a data acquisition system 42 which is used for interfacing the well transceiver 34 to the computer 30 for processing. The data acquisition system 42 is comprised of analog and digital inputs and outputs, computer bus interfaces, high voltage interfaces and signal processing electronics. An embodiment of data acquisition sensor 42 is shown in FIG. 5C and includes a pre-amplifier 320, band pass filter 322, gain controlled amplifier 324 and analog to digital converter 326. The data acquisition system (ADC) will process the analog signals detected by the surface receiver to conform to the required input specifications to the microprocessor based data processing and control system. The surface receiver 34 is used to detect the pulses received at the surface from inside the wellbore and convert them into signals compatible with the data acquisition preamplifier 320. The signals from the transducer will be low level analog voltages. The preamplifier 320 is used to increase the voltage levels and to decrease the noise levels encountered in the original signals from the transducers. Preamplifier 320 will also buffer the data to prevent any changes in impedance or problems with the transducer from damaging the electronics. The bandpass filter 322 eliminates the high and low frequency noises that are generated from external sources. The filter will allow the signals associated with the transducer frequencies to pass without any significant distortion or attenuation. The gain controlled amplifier 324 monitors the voltage level on the input signal and amplifies or attenuates it to assure that it stays within the acquired voltage ranges. The signals are conditioned to have the highest possible range to provide the largest resolution that can be achieved within the system. Finally, the analog to digital converter 326 will transform the analog signal received from the amplifier into a digital value equivalent to the voltage level of the analog signal. The conversion from analog to digital will occur after the microprocessor 30 commands the tool to start a conversion. The processor system 30 will set the ADC to process the analog signal into 8 or 16 bits of information. The ADC will inform the processor when a conversion is taking place and when it is competed. The processor 30 can at any time request the ADC to transfer the acquired data to the processor.

Still referring to FIG. 5, the electrical pulses from the transceiver 34 will be conditioned to fit within a range where the data can be digitized for processing by computer control 30. Communicating with both computer control 30 and transceiver 34 is a previously mentioned modem 36. Modem 36 is available to surface system 24 for transmission of the data from the well site to a remote location such as remote location 10 or a different control surface system 24 located on, for example, platform 2 or platform N. At this remote location, the data can be viewed and evaluated, or again, simply be communicated to other computers controlling other platforms. The remote computer 10 can take control over system 24 interfacing with the downhole control modules 22 and acquired data from the wellbore and/or control the status of the downhole devices and/or control the fluid flow from the well or from the formation. Also associated with the control surface system 24 is a depth measurement system which interfaces with computer control system 30 for providing information related to the location of the tools in the borehole as the tool string is lowered into the ground. Finally, control surface system 24 also includes one or more surface sensors 46 which are installed at the surface for monitoring well parameters such as pressure, rig pumps and heave, all of which can be connected to the surface system to provide the operator with additional information on the status of the well.

Surface system 24 can control the activities of the downhole control modules 22 by requesting data on a periodic basis and commanding the downhole modules to open, or close electromechanical devices and to change monitoring parameters due to changes in long term borehole conditions. As shown diagrammatically in FIG. 1, surface system 24, at one location such as platform 1, can interface with a surface system 24 at a different location such as platforms 2 or N or the central remote control sensor 10 via phone lines or via wireless transmission. For example, in FIG. 1, each surface system 24 is associated with an antenna 48 for direct communication with each other (i.e., from platform 2 to platform N), for direct communication with an antenna 50 located at central control system 10 (i.e., from platform 2 to control system 10) or for indirect communication via a satellite 52. Thus, each surface control center 24 includes the following functions:

1. Polls the downhole sensors for data information;
2. Processes the acquired information from the wellbore to provide the operator with formation, tools and flow status;
3. Interfaces with other surface systems for transfer of data and commands; and
4. Provides the interface between the operator and the downhole tools and sensors.

In a less preferred embodiment of the present invention, the downhole control system 22 may be comprised of any number of known downhole control systems which require a signal from the surface for actuation. Examples of such downhole control systems include those described in U.S. Pat. Nos. 3,227,228; 4,796,669; 4,896,722; 4,915,168; 5,050,675; 4,856,595; 4,971,160; 5,273,112; 5,273,113; 5,332,035; 5,293,937; 5,226,494 and 5,343,963, all of the contents of each patent being incorporated herein by reference thereto. All of these patents disclose various apparatus and methods wherein a microprocessor based controller downhole is actuated by a surface or other external signal such that the microprocessor executes a control signal which is transmitted to an electromechanical control device which then actuates a downhole tool such as a sliding sleeve, packer or valve. In this case, the surface control system 24 transmits the actuation signal to downhole controller 22.

Thus, in accordance with an embodiment of this invention, the aforementioned remote central control center 10, surface control centers 24 and downhole control systems 22 all cooperate to provide one or more of the following functions:

1. Provide one or two-way communication between the surface system 24 and a downhole tool via downhole control system 22;
2. Acquire, process, display and/or store at the surface data transmitted from downhole relating to the wellbore fluids, gases and tool status parameters acquired by sensors in the wellbore;
3. Provide an operator with the ability to control tools downhole by sending a specific address and command information from the central control center 10 or from an individual surface control center 24 down into the wellbore;
4. Control multiple tools in multiple zones within any single well by a single remote surface system 24 or the remote central control center 10;
5. Monitor and/or control multiple wells with a single surface system 10 or 24;
6. Monitor multiple platforms from a single or multiple surface system working together through a remote communications link or working individually;
7. Acquire, process and transmit to the surface from inside the wellbore multiple parameters related to the well status, fluid condition and flow, tool state and geological evaluation;
8. Monitor the well gas and fluid parameters and perform functions automatically such as interrupting the fluid flow to the surface, opening or closing of valves when certain acquired downhole parameters such as pressure, flow, temperature or fluid content are determined to be outside the normal ranges stored in the systems' memory (as described below with respect to FIGS. 6 and 7); and 9. Provide operator to system and system to operator interface at the surface using a computer control surface control system.

10. Provide data and control information among systems in the wellbore.

In a preferred embodiment and in accordance with an important feature of the present invention, rather than using a downhole control system of the type described in the aforementioned patents wherein the downhole activities are only actuated by surface commands, the present invention utilizes a downhole control system which automatically controls downhole tools in response to sensed selected downhole parameters without the need for an initial control signal from the surface or from some other external source. Referring to FIGS. 2, 3, 6 and 7, this downhole computer based control system includes a microprocessor based data processing and control system 50.

Electronics control system 50 acquires and processes data sent from the surface as received from transceiver system 52 and also transmits downhole sensor information as received from the data acquisition system 54 to the surface. Data acquisition system 54 will preprocess the analog and digital sensor data by sampling the data periodically and formatting it for transfer to processor 50. Included among this data is data from flow sensors 56, formation evaluation sensors 58 and electromechanical position sensor 59 (these latter sensors 59 provide information on position, orientation and the like of downhole tools). The formation evaluation data is processed for the determination of reservoir parameters related to the well production zone being monitored by the downhole control module. The flow sensor data is processed and evaluated against parameters stored in the downhole module's memory to determine if a condition exists which requires the intervention of the processor electronics 50 to automatically control the electromechanical devices. It will be appreciated that in accordance with an important feature of this invention, the automatic control executed by processor 50 is initiated without the need for a initiation or control signal from the surface or from some other external source. Instead, the processor 50 simply evaluates parameters existing in real time in the borehole as sensed by flow sensors 56 and/or formation evaluations sensors 58 and then automatically executes instructions for appropriate control. Note that while such automatic initiation is an important feature of this invention, in certain situations, an operator from the surface may also send control instructions downwardly from the surface to the transceiver system 52 and into the processor 50 for executing control of downhole tools and other electronic equipment. As a result of this control, the control system 50 may initiate or stop the fluid/gas flow from the geological formation into the borehole or from the borehole to the surface.

The downhole sensors associated with flow sensors 56 and formation evaluations sensors 58 may include, but are not limited to, sensors for sensing pressure, flow, temperature, oil/water content, geological formation, gamma ray detectors and formation evaluation sensors which utilize acoustic, nuclear, resistivity and electromagnetic technology. It will be appreciated that typically, the pressure, flow, temperature and fluid/gas content sensors will be used for monitoring the production of hydrocarbons while the formation evaluation sensors will measure, among other things, the movement of hydrocarbons and water in the formation. The downhole computer (processor 50) may automatically execute instructions for actuating electromechanical drivers 60 or other electronic control apparatus 62. In turn, the electromechanical driver 60 will actuate an electromechanical device for controlling a downhole tool such as a sliding sleeve, shut off device, valve, variable choke, penetrator, perf valve or gas lift tool. As mentioned, downhole computer 50 may also control other electronic control apparatus such as apparatus that may effect flow characteristics of the fluids in the well.

In addition, downhole computer 50 is capable of recording downhole data acquired by flow sensors 56, formation evaluation sensors 58 and electromechanical position sensors 59. This downhole data is recorded in recorder 66. Information stored in recorder 66 may either be retrieved from the surface at some later date when the control system is brought to the surface or data in the recorder may be sent to the transceiver system 52 and then communicated to the surface.

The borehole transmitter/receiver 52 transfers data from downhole to the surface and receives commands and data from the surface and between other downhole modules. Transceiver assembly 52 may consist of any known and suitable transceiver mechanism and preferably includes a device that can be used to transmit as well as to receive the data in a half duplex communication mode, such as an acoustic piezoelectric device (i.e., disclosed in aforementioned U.S. Pat. No. 5,222,049), or individual receivers such as accelerometers for full duplex communications where data can be transmitted and received by the downhole tools simultaneously. Electronics drivers may be used to control the electric power delivered to the transceiver during data transmission.

It will be appreciated that the downhole control system 22 requires a power source 66 for operation of the system. Power source 66 can be generated in the borehole, at the surface or it can be supplied by energy storage devices such as batteries. Power is used to provide electrical voltage and current to the electronics and electromechanical devices connected to a particular sensor in the borehole. Power for the power source may come from the surface through hardwiring or may be provided in the borehole such as by using a turbine. Other power sources include chemical reactions, flow control, thermal, conventional batteries, borehole electrical potential differential, solids production or hydraulic power methods.

Figure 7:
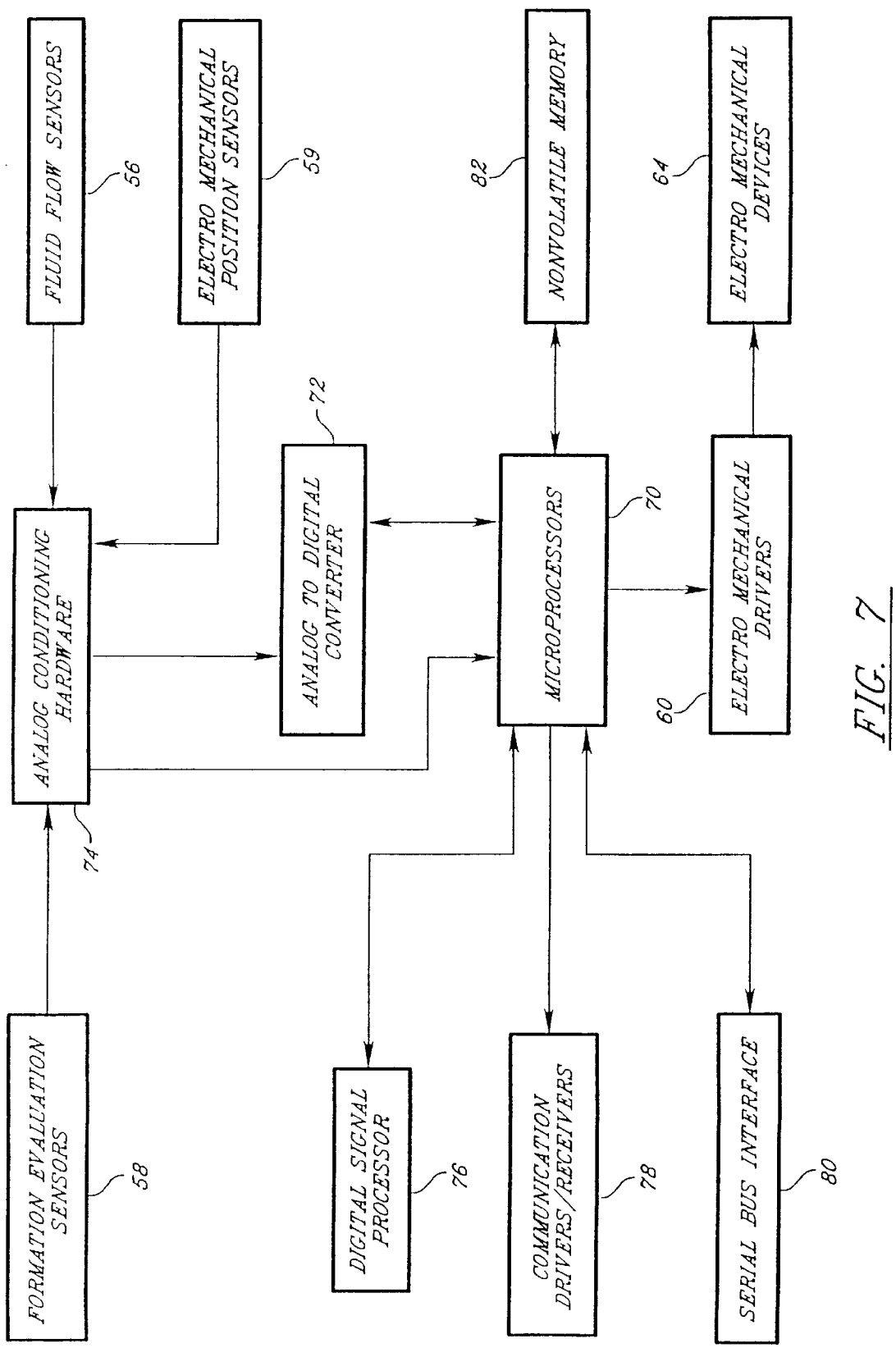
FIG. 7 is an electrical schematic of the downhole production well control system of FIG. 6.

Referring to FIG. 7, an electrical schematic of downhole controller 22 is shown. As discussed in detail above, the downhole electronics system will control the electromechanical systems, monitor formation and flow parameters, process data acquired in the borehole, and transmit and receive commands and data to and from other modules and the surface systems. The electronics controller is composed of a microprocessor 70, an analog to digital converter 72, analog conditioning hardware 74, digital signal processor 76, communications interface 78, serial bus interface 80, non-volatile solid state memory 82 and electromechanical drivers 60.

The microprocessor 70 provides the control and processing capabilities of the system. The processor will control the data acquisition, the data processing, and the evaluation of the data for determination if it is within the proper operating ranges. The controller will also prepare the data for transmission to the surface, and drive the transmitter to send the information to the surface. The processor also has the responsibility of controlling the electromechanical devices 64.

The analog to digital converter 72 transforms the data from the conditioner circuitry into a binary number. That binary number relates to an electrical current or voltage value used to designate a physical parameter acquired from the geological formation, the fluid flow, or status of the electromechanical devices. The analog conditioning hardware processes the signals from the sensors into voltage values that are at the range required by the analog to digital converter.

The digital signal processor 76 provides the capability of exchanging data with the processor to support the evaluation of the acquired downhole information, as well as to encode/decode data for transmitter 52. The processor 70 also provides the control and timing for the drivers 78.

The communication drivers 70 are electronic switches used to control the flow of electrical power to the transmitter. The processor 70 provides the control and timing for the drivers 78.

The serial bus interface 80 allows the processor 70 to interact with the surface data acquisition and control system 42 (see FIGS. 5 and 5C). The serial bus 80 allows the surface system 74 to transfer codes and set parameters to the micro controller 70 to execute its functions downhole.

The electromechanical drivers 60 control the flow of electrical power to the electromechanical devices 64 used for operation of the sliding sleeves, packers, safety valves, plugs and any other fluid control device downhole. The drivers are operated by the microprocessor 70.

The non-volatile memory 82 stores the code commands used by the micro controller 70 to perform its functions downhole. The memory 82 also holds the variables used by the processor 70 to determine if the acquired parameters are in the proper operating range.

It will be appreciated that downhole valves are used for opening and closing of devices used in the control of fluid flow in the wellbore. Such electromechanical downhole valve devices will be actuated by downhole computer 50 either in the event that a borehole sensor value is determined to be outside a safe to operate range set by the operator or if a command is sent from the surface. As has been discussed, it is a particularly significant feature of this invention that the downhole control system 22 permits automatic control of downhole tools and other downhole electronic control apparatus without requiring an initiation or actuation signal from the surface or from some other external source. This is in distinct contrast to prior art control systems wherein control is either actuated from the surface or is actuated by a downhole control device which requires an actuation signal from the surface as discussed above. It will be appreciated that the novel downhole control system of this invention whereby the control of electromechanical devices and/or electronic control apparatus is accomplished automatically without the requirement for a surface or other external actuation signal can be used separately from the remote well production control scheme shown in FIG. 1.

Figure 2:
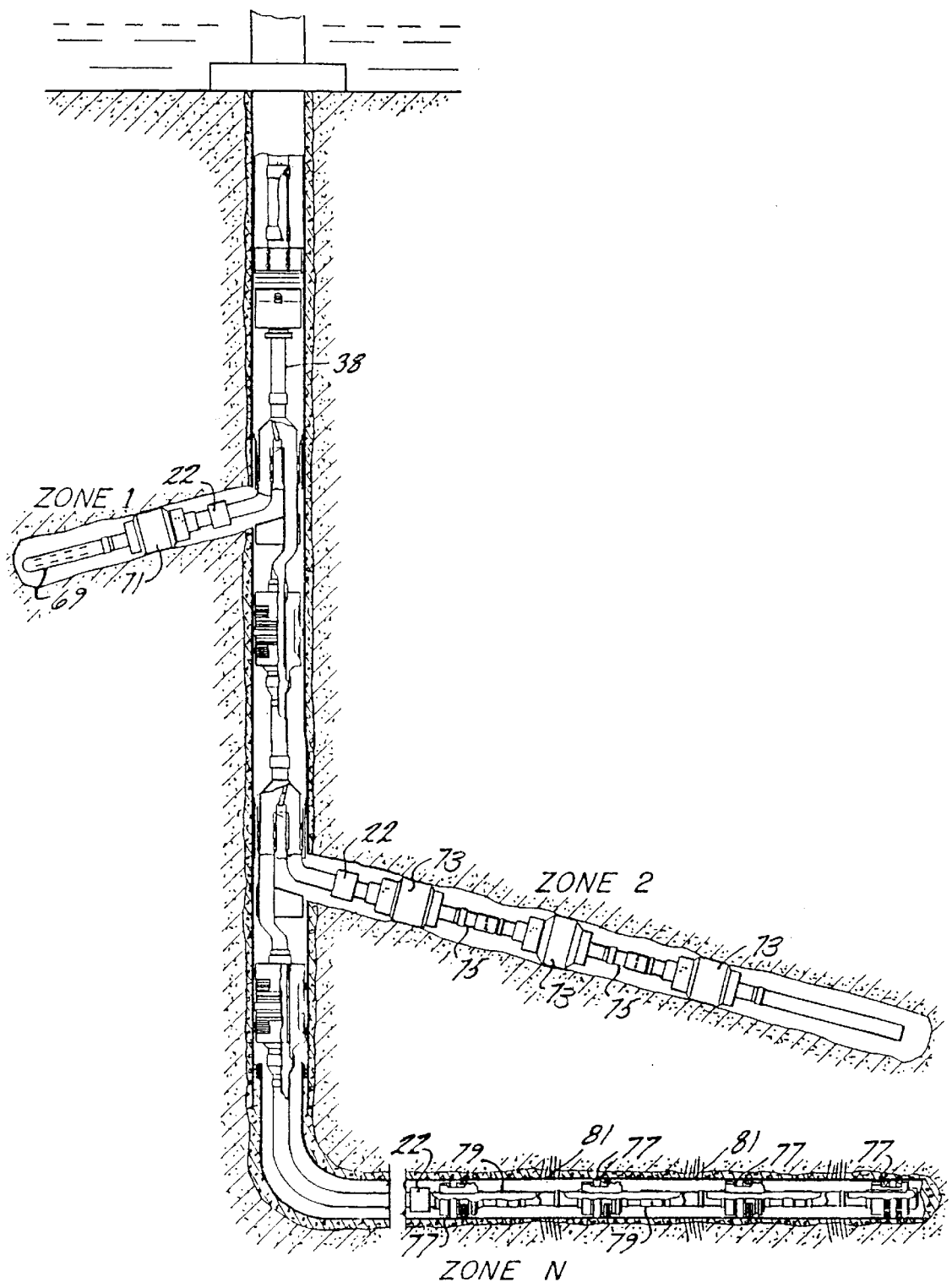
FIG. 2 is an enlarged diagrammatic view of a portion of FIG. 1 depicting a selected well and selected zones in such selected well and a downhole control system for use therewith.
Figure 3:
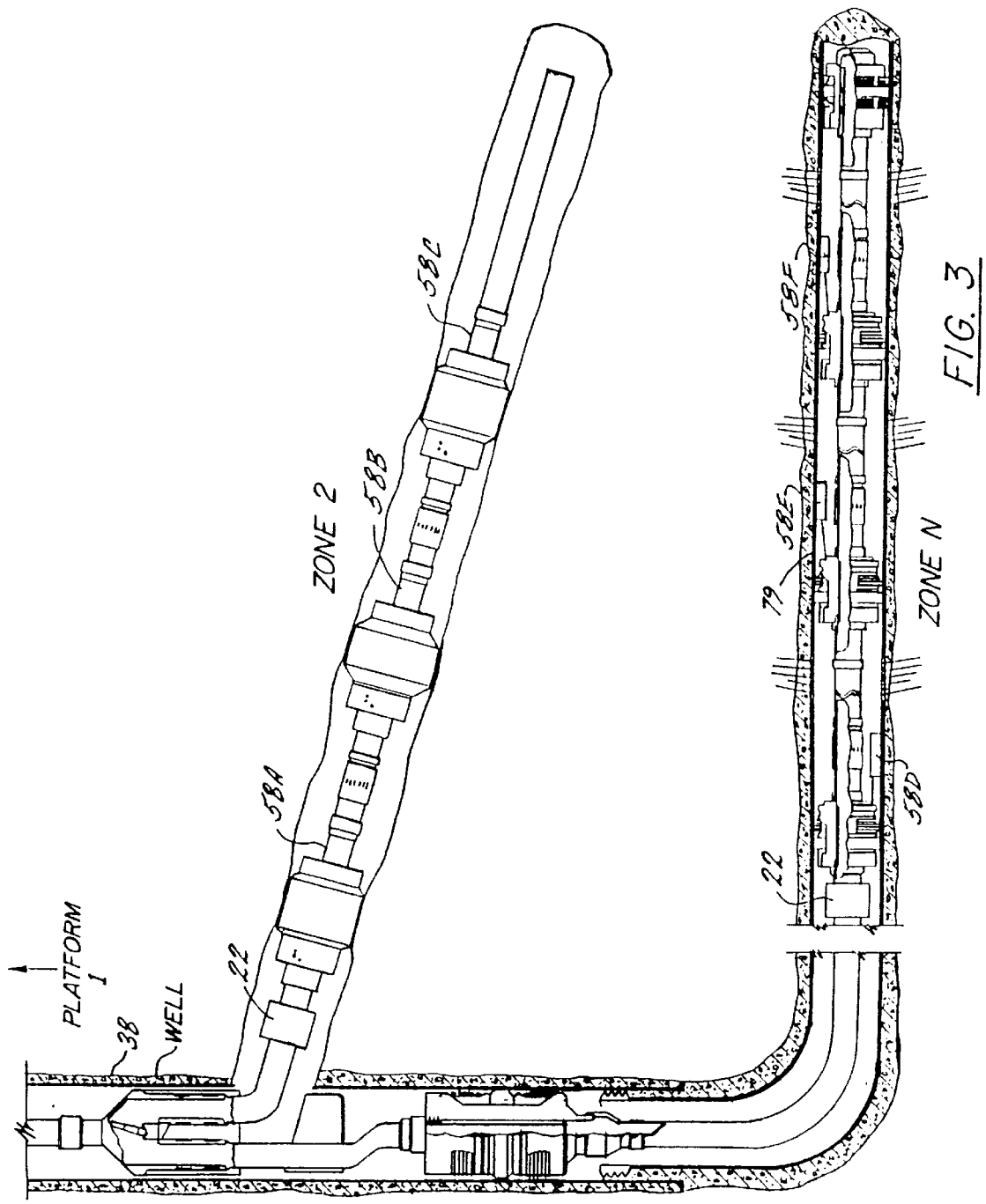
FIG. 3 is an enlarged diagrammatic view of a portion of FIG. 2 depicting control systems for both open hole and cased hole completion zones.
Figure 10:
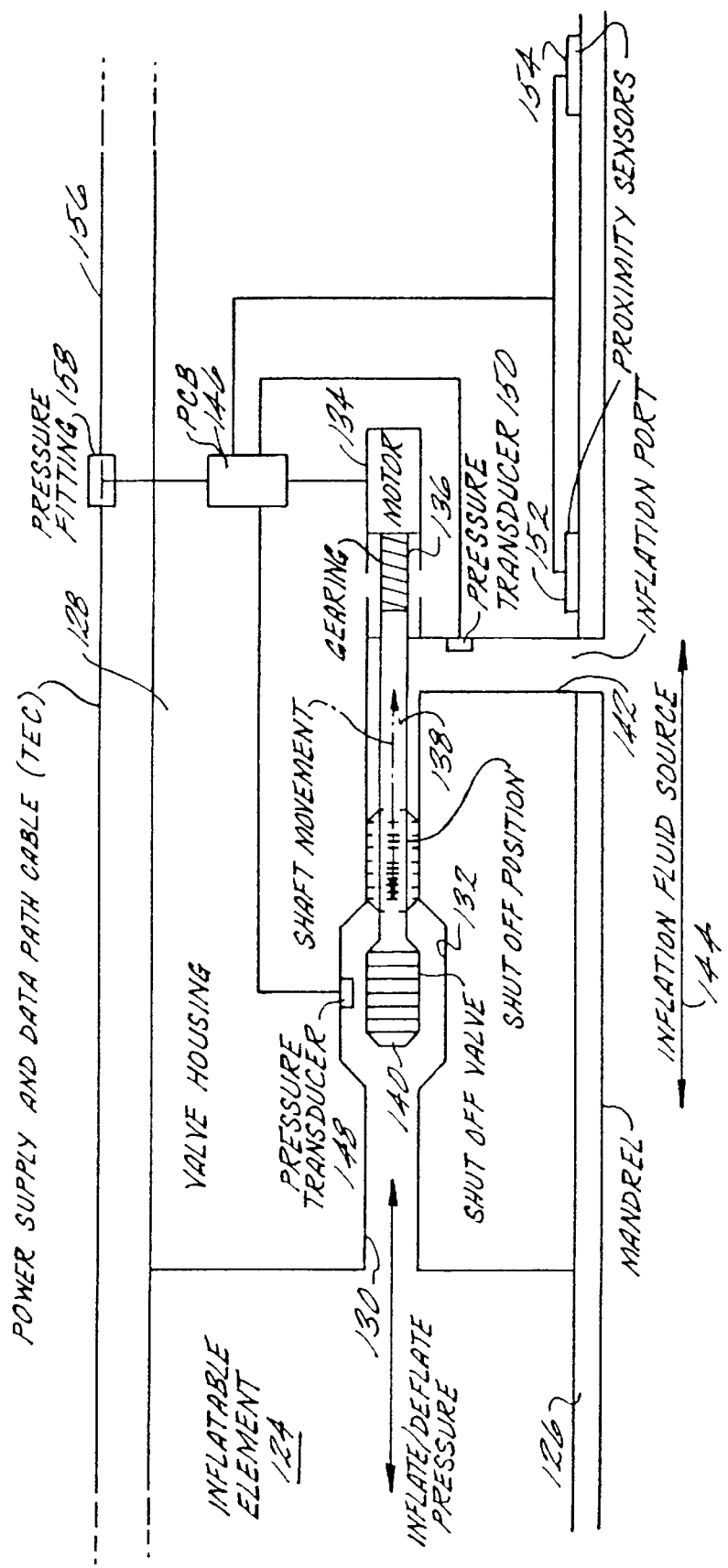
FIG. 10 is a diagrammatic view of a remotely controlled inflation/deflation device for downhole pressure monitoring.

Turning now to FIGS. 2 and 3, an example of the downhole control system 22 is shown in an enlarged view of well number 2 from platform 1 depicting zones 1, 2 and N. Each of zones 1, 2 and N is associated with a downhole control system 22 of the type shown in FIGS. 6 and 7. In zone 1, a slotted liner completion is shown at 69 associated with a packer 71. In zone 2, an open hole completion is shown with a series of packers 73 and intermittent sliding sleeves 75. In zone N, a cased hole completion is shown again with the series of packers 77, sliding sleeve 79 and perforating tools 81. The control system 22 in zone 1 includes electromechanical drivers and electromechanical devices which control the packers 69 and valving associated with the slotted liner so as to control fluid flow. Similarly, control system 22 in zone 2 include electromechanical drivers and electromechanical devices which control the packers, sliding sleeves and valves associated with that open hole completion system. The control system 22 in zone N also includes electromechanical drivers and electromechanical control devices for controlling the packers, sliding sleeves and perforating equipment depicted therein. Any known electromechanical driver 60 or electromechanical control device 64 may be used in connection with this invention to control a downhole tool or valve. Examples of suitable control apparatus are shown, for example, in commonly assigned U.S. Pat. Nos. 5,343,963; 5,199,497; 5,346,014; and 5,188,183, all of the contents of which are incorporated herein by reference; FIGS. 2, 10 and 11 of the '168 patent to Upchurch and FIGS. 10 and 11 of the '160 patent to Upchurch; FIGS. 11–14 of the '112 patent to Schultz; and FIGS. 1–4 of U.S. Pat. 3,227,228 to Bannister.

Controllers 22 in each of zones 1, 2 and N have the ability not only to control the electromechanical devices associated with each of the downhole tools. but also have the ability to control other electronic control apparatus which may be associated with, for example, valving for additional fluid control. The downhole control systems 22 in zones 1, 2 and N further have the ability to communicate with each other (for example through hard wiring) so that actions in one zone may be used to effect the actions in another zone. This zone to zone communication constitutes still another important feature of the present invention. In addition, not only can the downhole computers 50 in each of control systems 22 communicate with each other, but the computers 50 also have ability (via transceiver system 52) to communicate through the surface control system 24 and thereby communicate with other surface control systems 24 at other well platforms (i.e., platforms 2 or N), at a remote central control position such as shown at 10 in FIG. 1, or each of the processors 50 in each downhole control system 22 in each zone 1, 2 or N can have the ability to communicate through its transceiver system 52 to other downhole computers 50 in other wells. For example, the downhole computer system 22 in zone 1 of well 2 in platform 1 may communicate with a downhole control system on platform 2 located in one of the zones or one of the wells associated therewith. Thus, the downhole control system of the present invention permits communication between computers in different wellbores, communication between computers in different zones and communication between computers from one specific zone to a central remote location.

Information sent from the surface to transceiver 52 may consist of actual control information, or may consist of data which is used to reprogram the memory in processor 50 for initiating of automatic control based on sensor information. In addition to reprogramming information, the information sent from the surface may also be used to recalibrate a particular sensor. Processor 50 in turn may not only send raw data and status information to the surface through transceiver 52, but may also process data downhole using appropriate algorithms and other methods so that the information sent to the surface constitutes derived data in a form well suited for analysis.

Referring to FIG. 3, an enlarged view of zones 2 and N from well 2 of platform 1 is shown. As discussed, a plurality of downhole flow sensors 56 and downhole formation evaluation sensors 58 communicate with downhole controller 22. The sensors are permanently located downhole and are positioned in the completion string and/or in the borehole casing. In accordance with still another important feature of this invention, formation evaluation sensors may be incorporated in the completion string such as shown at 58A–C in zone 2; or may be positioned adjacent the borehole casing 78 such as shown at 58D–F in zone N. In the latter case, the formation evaluation sensors are hardwired back to control system 22. The formation evaluation sensors may be of the type described above including density, porosity and resistivity types. These sensors measure formation geology, formation saturation, formation porosity, gas influx, water content, petroleum content and formation chemical elements such as potassium, uranium and thorium. Examples of suitable sensors are described in commonly assigned U.S. Pat. Nos. 5,278,758 (porosity), 5,134,285 (density) and 5,001,675 (electromagnetic resistivity), all of the contents of each patent being incorporated herein by reference.

Figure 14:
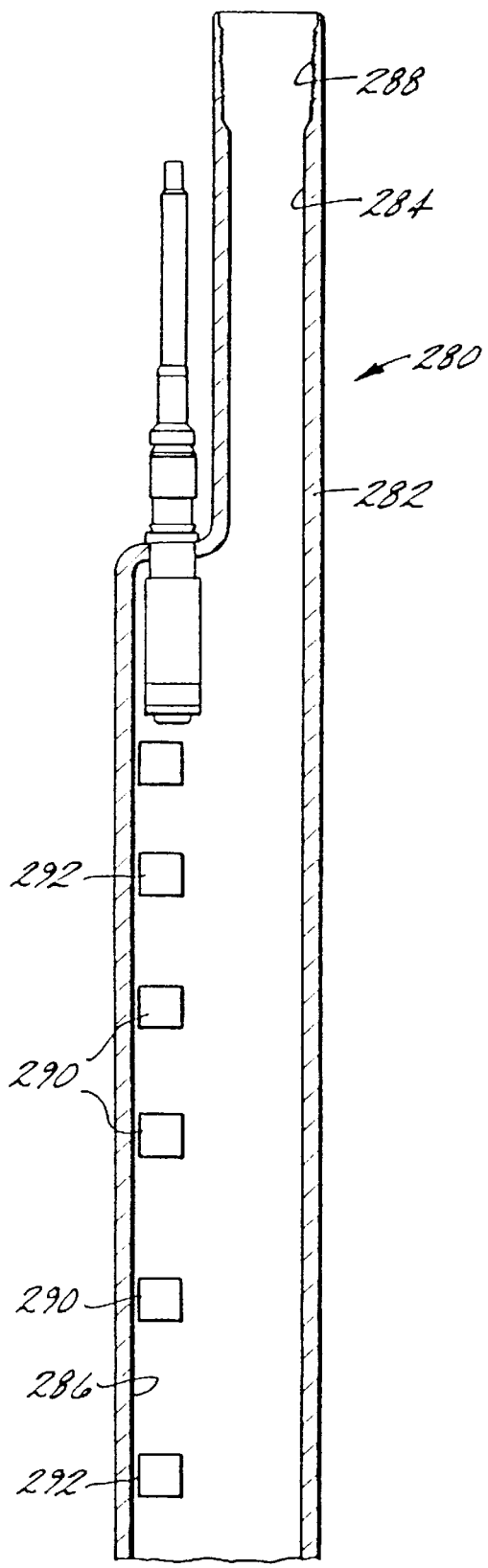
FIG. 14 is a cross-sectional side elevation view of a downhole formation evaluation sensor in accordance with the present invention.

Referring to FIG. 14, an example of a downhole formation evaluation sensor for permanent placement in a production well is shown at 280. This sensor 280 is comprised of a side pocket mandrel 282 which includes a primary longitudinal bore 284 and a laterally displaced side pocket 286. Mandrel 282 includes threading 288 at both ends for attachment to production tubing. Positioned sequentially in spaced relation longitudinally along side pocket 286 are a plurality (in this case 3) of acoustic, electromagnetic or nuclear receivers 290 which are sandwiched between a pair of respective acoustic, electromagnetic or nuclear transmitters 292. Transmitters 292 and receivers 290 all communicate with appropriate and known electronics for carrying out formation evaluation measurements.

The information regarding the formation which is obtained by transmitters 292 and receivers 286 will be forwarded to a downhole module 22 and transmitted to the surface using any of the aforementioned hardwired or wireless communications techniques. In the embodiment shown in FIG. 14, the formation evaluation information is transmitted to the surface on inductive coupler 294 and tubular encased conductor (TEC) 296, both of which will be described in detail hereinafter.

As mentioned above, in the prior art, formation evaluation in production wells was accomplished using expensive and time consuming wire line devices which was positioned through the production tubing. The only sensors permanently positioned in a production well were those used to measure temperature, pressure and fluid flow. In contrast, the present invention permanently locates formation evaluation sensors downhole in the production well. The permanently positioned formation evaluation sensors of the present invention will monitor both fluid flow and, more importantly, will measure formation parameters so that changing conditions in the formation will be sensed before problems occur. For example, water in the formation can be measured prior to such water reaching the borehole and therefore water will be prevented from being produced in the borehole. At present, water is sensed only after it enters the production tubing.

The formation evaluation sensors of this invention are located closer to the formation as compared to wireline sensors in the production tubing and will therefore provide more accurate results. Since the formation evaluation data will constantly be available in real or near real time, there will be no need to periodically shut in the well and perform costly wireline evaluations.

The multiwell/multizone production well control system of the present invention may be operated as follows:

1. Place the downhole systems 22 in the tubing string 38.
2. Use the surface computer system 24 to test the downhole modules 22 going into the borehole to assure that they are working properly.
3. Program the modules 22 for the proper downhole parameters to be monitored.
4. Install and interface the surface sensors 46 to the computer controlled system 24.
5. Place the downhole modules 22 in the borehole, and assure that they reach the proper zones to be monitored and/or controlled by gathering the formation natural gamma rays in the borehole, and comparing the data to existing MWD or wireline logs, and monitoring the information provided by the depth measurement module 44.
6. Collect data at fixed intervals after all downhole modules 22 have been installed by polling each of the downhole systems 22 in the borehole using the surface computer based system 24.
7. If the electromechanical devices 64 need to be actuated to control the formation and/or well flow, the operator may send a command to the downhole electronics module 50 instructing it to actuate the electromechanical device. A message will be sent to the surface from the electronics control module 50 indicating that the command was executed. Alternatively, the downhole electronics module may automatically actuate the electromechanical device without an external command from the surface.
8. The operator can inquire the status of wells from a remote location 10 by establishing a phone or satellite link to the desired location. The remote surface computer 24 will ask the operator for a password for proper access to the remote system.
9. A message will be sent from the downhole module 22 in the well to the surface system 24 indicating that an electromechanical device 64 was actuated by the downhole electronics 50 if a flow or borehole parameter changed outside the normal operating range. The operator will have the option to question the downhole module as to why the action was taken in the borehole and overwrite the action by commanding the downhole module to go back to the original status. The operator may optionally send to the module a new set of parameters that will reflect the new operating ranges.
10. During an emergency situation or loss of power all devices will revert to a known fail safe mode.

The production well control system of this invention may utilize a wide variety of conventional as well as novel downhole tools, sensors, valving and the like. Examples of certain preferred and novel downhole tools for use in the system of the present invention include:

1. a retrievable sensor gauge side pocket mandrel;
2. subsurface safety valve position and pressure monitoring system;
3. remotely controlled inflation/deflation device with pressure monitoring;
4. remotely actuated downhole tool stop system;
5. remotely controlled fluid/gas control system; and
6. remotely controlled variable choke and shut-off valve system.

The foregoing listed tools will now be described with reference to FIGS. 8–13.

Retrievable Pressure Gauge Side Pocket Mandrel with Inductive Coupler

Traditional permanent downhole gauge (e.g. sensor) installations require the mounting and installation of a pressure gauge external to the production tubing thus making the gauge an integral part of the tubing string. This is done so that tubing and/or annulus pressure can be monitored without restricting the flow diameter of the tubing. However, a drawback to this conventional gauge design is that should a gauge fail or drift out of calibration requiring replacement, the entire tubing string must be pulled to retrieve and replace the gauge. In accordance with the present invention an improved gauge or sensor construction (relative to the prior art permanent gauge installations), is to mount the gauge or sensor in such a manner that it can be retrieved by common wireline practices through the production tubing without restricting the flow path. This is accomplished by mounting the gauge in a side pocket mandrel.

Side pocket mandrels have been used for many years in the oil industry to provide a convenient means of retrieving or changing out service devices needed to be in close proximity to the bottom of the well or located at a particular depth. Side pocket mandrels perform a variety of functions, the most common of which is allowing gas from the annulus to communicate with oil in the production tubing to lighten it for enhanced production. Another popular application for side pocket mandrels is the chemical injection valve, which allows chemicals pumped from the surface, to be introduced at strategic depths to mix with the produced fluids or gas. These chemicals inhibit corrosion, particle build up on the I.D. of the tubing and many other functions.

Figure 8A:
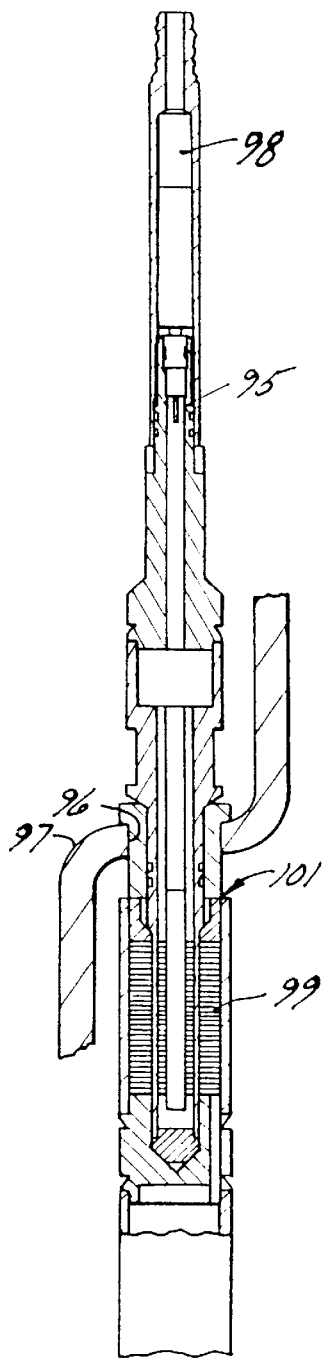
FIG. 8A is an enlarged view of a portion of FIG. 8.
Figure 8:
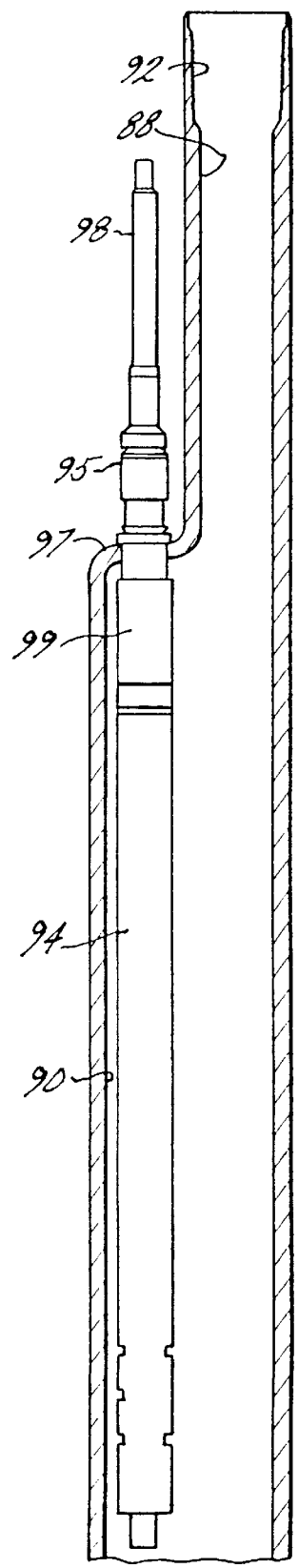
FIG. 8 is a cross-sectional elevation view of a retrievable pressure gauge side pocket mandrel in accordance with the present invention.

As mentioned above, permanently mounted pressure gauges have traditionally been mounted to the tubing which in effect makes them part of the tubing. By utilizing a side pocket mandrel however, a pressure gauge or other sensor may be installed in the pocket making it possible to retrieve when necessary. This novel mounting method for a pressure gauge or other downhole sensor is shown in FIGS. 8 and 8A. In FIG. 8, a side pocket mandrel (similar to side pocket mandrel 282 in FIG. 14) is shown at 86 and includes a primary through bore 88 and a laterally displaced side pocket 90. Mandrel 86 is threadably connected to the production tubing using threaded connection 92. Positioned in side pocket 90 is a sensor 94 which may comprise any suitable transducer for measuring flow, pressure, temperature or the like. In the FIG. 8 embodiment, a pressure/temperature transducer 94 (Model 2225A or 2250A commercially available from Panex Corporation of Houston, Tex.) is depicted having been inserted into side pocket 90 through an opening 96 in the upper surface (e.g., shoulder) 97 of side pocket 90 (see FIG. 8A).

Information derived from downhole sensor 94 may be transmitted to a downhole electronic module 22 as discussed in detail above or may be transmitted (through wireless or hardwired means) directly to a surface system 24. In the FIGS. 8 and 8A embodiments, a hardwired cable 98 is used for transmission. Preferably the cable 98 comprises tubular encased conductor or TEC available from Baker Oil Tools of Houston, Tex. TEC comprises a centralized conductor or conductors encapsulated in a stainless steel or other steel jacket with or without epoxy filling. An oil or other pneumatic or hydraulic fluid fills the annular area between the steel jacket and the central conductor or conductors. Thus, a hydraulic or pneumatic control line is obtained which contains an electrical conductor. The control line can be used to convey pneumatic pressure or fluid pressure over long distances with the electrical insulated wire or wires utilized to convey an electrical signal (power and/or data) to or from an instrument, pressure reading device, switch contact, motor or other electrical device. Alternatively, the cable may be comprised of Center-Y tubing encased conductor wire which is also available from Baker Oil Tools. This latter cable comprises one or more centralized conductor encased in a Y-shaped insulation, all of which is further encased in an epoxy filled steel jacket. It will be appreciated that the TEC cable must be connected to a pressure sealed penetrating device to make signal transfer with gauge 94. Various methods including mechanical (e.g., conductive), capacitive, inductive or optical methods are available to accomplish this coupling of gauge 94 and cable 92. A preferred method which is believed most reliable and most likely to survive the harsh downhole environment is a known "inductive coupler" 99.

Transmission of electronic signals by means of induction have been in use for many years most commonly by transformers. Transformers are also referred to as inductors, provide a means of transmitting electrical current without a physical connection by the terminal devices. Sufficient electrical current flowing through a coil of wire can induce a like current in a second coil if it is in very close proximity to the first. The drawback of this type of transmission is that efficiency is low. A loss of power is experienced because there is no physical contact of conductors; only the influence of one magnetic field in the source coil driving an electric current in the second. To achieve communication through the inductive device 99, an alternating current (AC) must be used to create the operating voltage. The AC is then rectified or changed to direct current (DC) to power the electronic components.

Much like the inductive coupler or transformer method of signal transmission, a very similar principle exists for what are known as "capacitive couplers". These capacitance devices utilize the axiom that when two conductors or poles in close proximity to each other are charged with voltages or potential differences of opposite polarity, a current can be made to flow through the circuit by influencing one of the poles to become more positive or more negative with respect to the other pole. When the process is repeated several times a second, a frequency is established. When the frequency is high enough, (several thousand times per second), a voltage is generated "across" the two poles. Sufficient voltage can be created to provide enough power for microprocessing and digital circuitry in the downhole instruments. Once powered up, the downhole device can transmit; radio- metric, digital or time shared frequency trains which can be modulated on the generated voltage and interpreted by the surface readout device. Thus, a communication is established between downhole device and the surface. As with inductive devices, capacitive devices can suffer line loss through long lengths of cable if the communication frequency is too high causing the signal to be attenuated by the inherent capacitance of the cable itself. Again, as with the inductive devices, capacitive devices must use the alternating current (AC) method of transmission with rectification to DC to power the electronics.

By transmitting beams of light through a glass fiber cable, electronic devices can also communicate with one another using a light beam as a conductor as opposed to a solid metal conductor in conventional cable. Data transmission is accomplished by pulsing the light beam at the source (surface instrument which is received by an end device (downhole instrument) which translates the pulses and converts them into electronic signals. Conductive or mechanical coupling is simply making a direct physical connection of one conductor to another. In the side pocket mandrel 86, a conductor is present in the pocket 90, pressure sealed as it penetrates the body of the side pocket and mated to an external device to transmit the signal to the surface (i.e., solid conductor cable, wireless transceiver or other device). The hard wired coupler may exist in any form conducive to proper electronic signal transmission while not compromising the pressure sealing integrity of the tool. The coupler must also be capable of surviving exposure to harsh downhole conditions while in the unmated condition as would be the case when an instrument 94 was not installed in the pocket 90.

The preferred inductive coupler 99 is connected to TEC cable 98 using a pressure sealed connector 95.

With the gauge or other sensor 90 being internal and exposed to the I.D. of the tubing 88, and the cable 98 being external to the mandrel 86, but exposed to the annulus environment, the connector 95 must penetrate the mandrel pocket 90 allowing gauge 94 and cable 98 to be mated. Due to pressure differences between the tubing I.D. and the annulus, connector 95 also provides a pressure seal so as to prevent communication between the mandrel and annulus.

An electronic monitoring device 94 which is "landed" in side pocket 90 of mandrel 86, includes a latching mechanism 101 to keep sensor 94 in place as pressure is exerted on it either from the interior of the mandrel or the annulus side. This latching mechanism 101 also provides a means of being unlatched so the device may be retrieved. Several methods exist to accomplish this latching, such as using specific profiles in pocket 90 that align with spring loaded dogs (not shown) on the sensor device 94. Once aligned, the springs force the locking dogs out to meet the profile of the pocket 90 providing a lock, much like tumblers in an ordinary household key operated lock. This locking action prevents the sensor tool 94 from being dislodged from its landing seat. This is important as any movement up or down could cause misalignment and impair the integrity of the electronic coupling device 99 to which the sensor tool 94 is now mated.

The latching mechanism 101 must be of sufficient robustness as to be able to withstand several landing and retrieval operations without comprising the integrity of the latching and release properties of sensor tool 94.

As mentioned, pressure integrity should be maintained to keep the mandrel isolated from the annulus. When the sensor tool 94 is being landed in pocket 90, it should activate or deactivate pressure sealing device 95 to expose the sensing portion of the sensor tool 94, to either the mandrel or annulus. Similarly, when sensor tool 94 is retrieved from pocket 90, it must also seal off any pressure port that was opened during the landing procedure.

The pressure porting mechanism is capable of being selectively opened to either the annulus or the mandrel. The selection device can be, but is not limited to, a specific profile machined to the outer housing of the sensor tool 94 combined with different configurations of locking/actuating dogs to: open a sliding sleeve, sting into a dedicated pressure port, displace a piston or any suitable configuration of pressure port opening or closing devices. Once activating the selected port, a positive seal must be maintained on the unselected port to prevent leakage or sensing of an undesired condition (pressure, flow, water cut etc.) while in the unmated condition as would be the case when an instrument was not installed in the pocket.

Subsurface Safety Valve Position and Pressure Monitoring System

Figure 9:
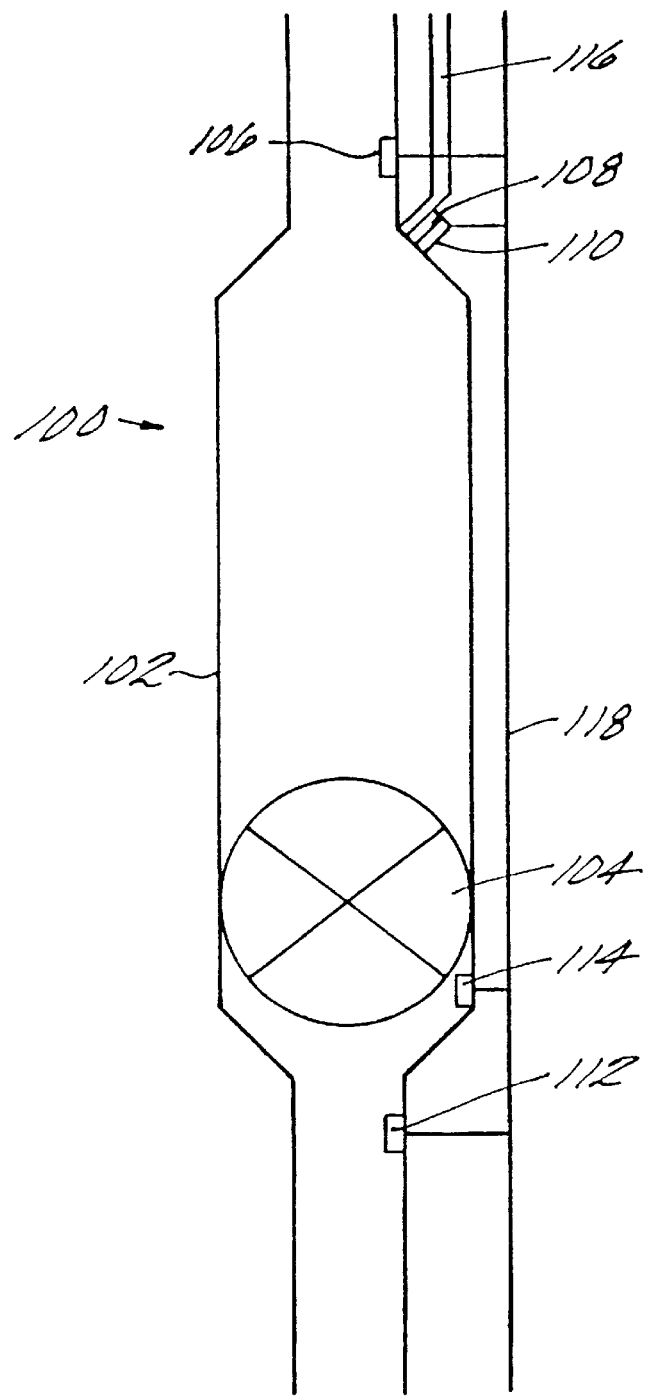
FIG. 9 is a diagrammatic view of a subsurface safety valve position and pressure monitoring system.

Referring to FIG. 9, a subsurface safety valve position and pressure monitoring system is shown generally at 100. System 100 includes a valve housing 102 which houses a downhole valve such as a shut-in valve 104. Various pressure and positioning parameters of shut-in valve 104 are determined through the interaction of five sensors which are preferably tied to a single electrical single conductor or multi conductor line (e.g., the aforementioned TEC cable). These five sensors remotely monitor the critical pressures and valve positions relative to safe, reliable remotely controlled subsurface safety valve operations. The downhole sensors include four pressure sensors 106, 108, 110 and 112 and one proximity sensor 114. Pressure sensor or transducer 106 is positioned to sense tubing pressure upstream of shut-in valve 104. Pressure transducer 108 is positioned to sense the hydraulic control-line pressure from hydraulic control-line 116. Pressure transducer 110 is positioned to sense the annulus pressure at a given depth while pressure transducer 112 is positioned to sense the tubing pressure downstream of valve 104. Proximity sensor 114 is positioned external to the valve or closure member 104 and functions so as to enable confirmation of the position of the valve 104. Encoded signals from each of the sensors 106 through 114 are fed back to the surface system 24 or to a downhole module 22 through a power supply/data cable 118 connected to the surface system 24 or downhole module 22. Alternatively, the encoded signals may be transmitted by a wireless transmission mechanism. Preferably cable 118 comprises tubing encapsulated single or multiconductor line (e.g., the aforementioned TEC cable) which is run external to the tubing stream downhole and serves as a data path between the sensors and the surface control system.

A downhole module 22 may automatically or upon control signals sent from the surface, actuate a downhole control device to open or shut valve 104 based on input from the downhole sensors 106 through 114.

The foregoing subsurface valve position and pressure monitoring system provides many features and advantages relative to prior art devices. For example, the present invention provides a means for absolute remote confirmation of valve position downhole. This is crucial for confident through tubing operations with wireline or other conveyance means and is also crucial for accurate diagnosis of any valve system malfunctions. In addition, the use of the subsurface safety valve position and pressure monitoring system of this invention provides real time surface confirmation of proper pressure conditions for fail-safe operation in all modes. Also, this system provides a means for determination of changes in downhole conditions which could render the safety system inoperative under adverse or disaster conditions and the present invention provides a means for surface confirmation of proper valve equalization prior to reopening after downhole valve closure.

Remotely Controlled Inflation/Deflation Device with a Pressure Monitoring System Referring now to FIG. 10, a microprocessor based device for monitoring of pressures associated with the inflation of downhole tools is presented. This microprocessor based device can be actuated either automatically by the downhole control module 22 or the downhole control module 22 may actuate the present device via a surface signal which is transmitted downhole from the surface system 24. In FIG. 10, the inflatable element (such as a packer) is shown at 124 and is mounted in a suitable mandrel 126. Associated with inflatable element 124 is a valve housing 128 which includes an axial opening 130 having a first diameter and a coaxial cavity 132 having a second diameter larger than the first diameter. Also within valve housing 128 is a motor 134 which actuates appropriate gearing 136 so as to provide linear translation to a shaft 138 having a piston-type valve 140 mounted to one end thereof. As shown by the arrows in FIG. 10, motor 130 actuates gearing 136 so as to move piston 140 between a closed or shut-off position in which piston 140 resides completely in axial opening 130 and an open position wherein piston 140 resides within the central cavity 132. Axial opening 130 terminates in the interior of valve housing 128 at an inflation port 142 through which fluid from an inflation fluid source 144 enters and exits in the interior of valve housing 128.

In accordance with an important feature of the present invention, the inflation/deflation device 124 is remotely controlled and/or monitored using a plurality of sensors in conjunction with a microprocessor based controller 146. Of course controller 146 is analogous to the downhole modules 22 discussed in great detail above in connection with for example, FIGS. 6 and 7. In a preferred embodiment of this invention, a pair of pressure transducers communicate with microprocessor controller 146. One pressure transducer is shown at 148 and resides within the internal cavity 132 of valve housing 128. The second pressure transducer is shown at 150 and resides in the inflation port 142. In addition, a pair of cooperating proximity sensors 152 and 154 are positioned between valve housing 128 and the mandrel 126. Preferably, both power and data are supplied to controller 146 through appropriate cable 156 via a pressure fitting 158. This cable is preferably the TEC cable described above. Power may also be supplied by batteries or the like and data may be transmitted using wireless methods.

It will be appreciated that the sealing device of this invention functions as a valve and serves to positively open and close the inflation fluid passage thereby permitting movement of inflation fluid from the fluid source 144 to the sealing element 124. In the particular embodiment described in FIG. 10, the valve 140 operates by axially displacing the sealing element 124 between the two diametrical bores within the fluid passageway by way of the motor gearing mechanism 134/136 all of which is driven by the on-board microprocessor 146. Valve 140 has two functional positions i.e., open and closed. Of course, the valve could function in alternative manners such as a solenoid. The electronic controller 146 serves to integrate the pressure inputs from pressure transducers 148 and 150 and the proximity inputs from proximity sensors 152 and 154 along with the data/ control path 156 to appropriately drive the control valve mechanism during tool inflation. Thereafter, the sensors 148, 150, 152 and 154 serve to ensure pressure integrity and other tool position functions.

The remotely controlled inflation/deflation device of the present invention offers many features and advantages. For example, the present invention eliminates the present standard industry design for pressure actuated shear mechanisms which are subject to wide variations in actuation pressures and premature inflation. The present invention provides a directly controllable mechanism for initiation of downhole tool inflation and through the unique self cleaning inflation control valve configuration shown in FIG. 10, obsoletes present design configurations which are subject to fouling by debris in the inflation fluid. In addition, the present invention enables direct control of closure of the inflation valve whereas in the prior art, spring loaded and pressure actuated designs resulted in pressure loss during operation and unreliable positive sealing action. The use of a motor driven, mechanical inflation control valve also constitutes an important feature of this invention. Still another feature of this invention is the incorporation of electronic proximity sensors in relation to inflatable tools so as to ensure correct positioning of selective inflation tools. High angle/ horizontal orientation of inflatable tools requires conveyance of inflation tools via coil tubing which is subject to substantial drag. In contrast to the present invention, the prior art has been limited to positioning of inflation tools by collet type devices or pressure operated devices, both of which were highly unreliable under these conditions. The use of a microprocessor in conjunction with an inflatable downhole tool and the use of a microprocessor based system to provide both inflation and deflation to control the downhole tools also constitute important features of this invention. The present invention thus enables multiple, resettable operations in the event that procedures may so require or in the event of initially incorrect positioning of tools within a wellbore. Finally, the present invention provides a continuous electronic pressure monitoring system to provide positive, real time wellbore and/ zonal isolation integrity downhole.

Remotely Actuated Downhole Tool Stop System

Figures 11A, 11B:
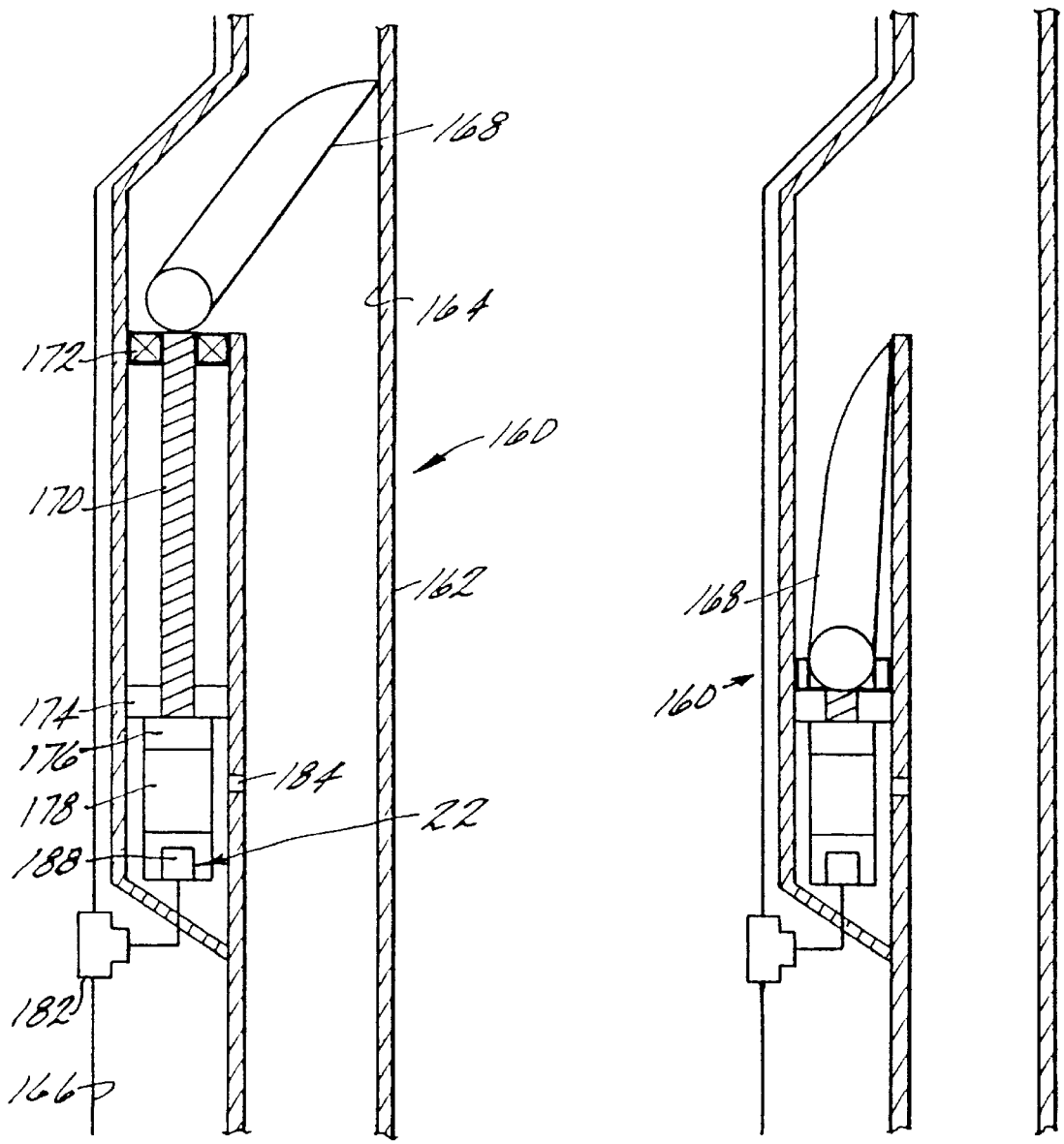
FIGS. 11A and 11B are diagrammatic views of a system for remotely actuated downhole tool stops in respective extended and retracted positions.

Referring to FIGS. 11A and 11B, a remotely actuated tool stop in accordance with the present invention is shown generally at 160. In the embodiment shown, the remotely actuated tool stop includes a side pocket mandrel 162 having a primary bore 164 and a side bore 166. A tool stop 168 is pivotally mounted onto a threaded shaft 170 with shaft 170 being sealed by seal 172 to prevent the flow of fluid or other debris into sidebore 166. Threaded shaft 170 is connected to a holddown 174 which in turn is connected to appropriate gearing 176 and a motor 178. While motor 178 may be powered by a variety of known means, preferably an inductive coupler 180 of the type described above is used to power the motor through a tubular encased conductor or TEC 192 as described above. Note that a pressure relief port 184 is provided between sidebore 166 and primary bore 164.

The foregoing system described in FIG. 11 A functions to provide a remotely actuated device which positively limits the downward movement of any tools used within the wellbore. A primary utilization of the tool stop includes use as a positioning device at close proximity (i.e. below) to a tool, for example or the side pocket mandrel 162. The system of this invention may also be used with other difficult to locate devices in high angle or horizontal wellbores. In this manner, when activated as shown in FIG. 11A, the surface operator may proceed downward with a work string until contact is made with tool stop 168. The tools and/or work string being delivered downhole may then be pulled back up a known distance thus ensuring proper positioning to perform the intended function in the targeted receptacle. An alternative function would be as a general purpose safety device, positioned close to the bottom of the tubing string in the wellbore. The tool stop system of this invention would then be activated whenever wireline or coiled tubing operations are being performed above and within the wellbore. In the event that the work string or individual tools are accidentally dropped, the tool stop of this invention ensures that they are not lost downhole and provides for easy retrieval at the tool stop depth. After through tubing operations are concluded, the tool stop system of this invention is deactivated/retracted as shown in FIG. 11B to provide a clear tubing bore 164 for normal well production or injection. It will be appreciated that during use, motor 178 will actuate gearing 176 which in turn will rotate threaded shaft 170 so as to raise tool stop 168 to the position shown in FIG. 11A or lower (deactivate or withdraw) tool stop 168 to the retracted position shown in FIG. 11B. The motor will be digitally controlled by an electronics control module 22 provided in inductive coupler section 180. Control module 22 can either be actuated by a surface or external control signal or may be automatically actuated downhole based on preprogrammed instructions as described above with regard to FIG. 7.

The remotely actuated tool stop of the present invention offers many features and advantages including a means for selective surface actuation of a downhole device to prevent tool loss; a means for selective surface actuation of a downhole device to provide for positive tool location downhole and as a means to prevent accidental impact damage to sensitive tools downhole such as subsurface safety valves and inflatable tubing plugs.

Remotely Controlled Fluids/Gas Control System

Figure 12:
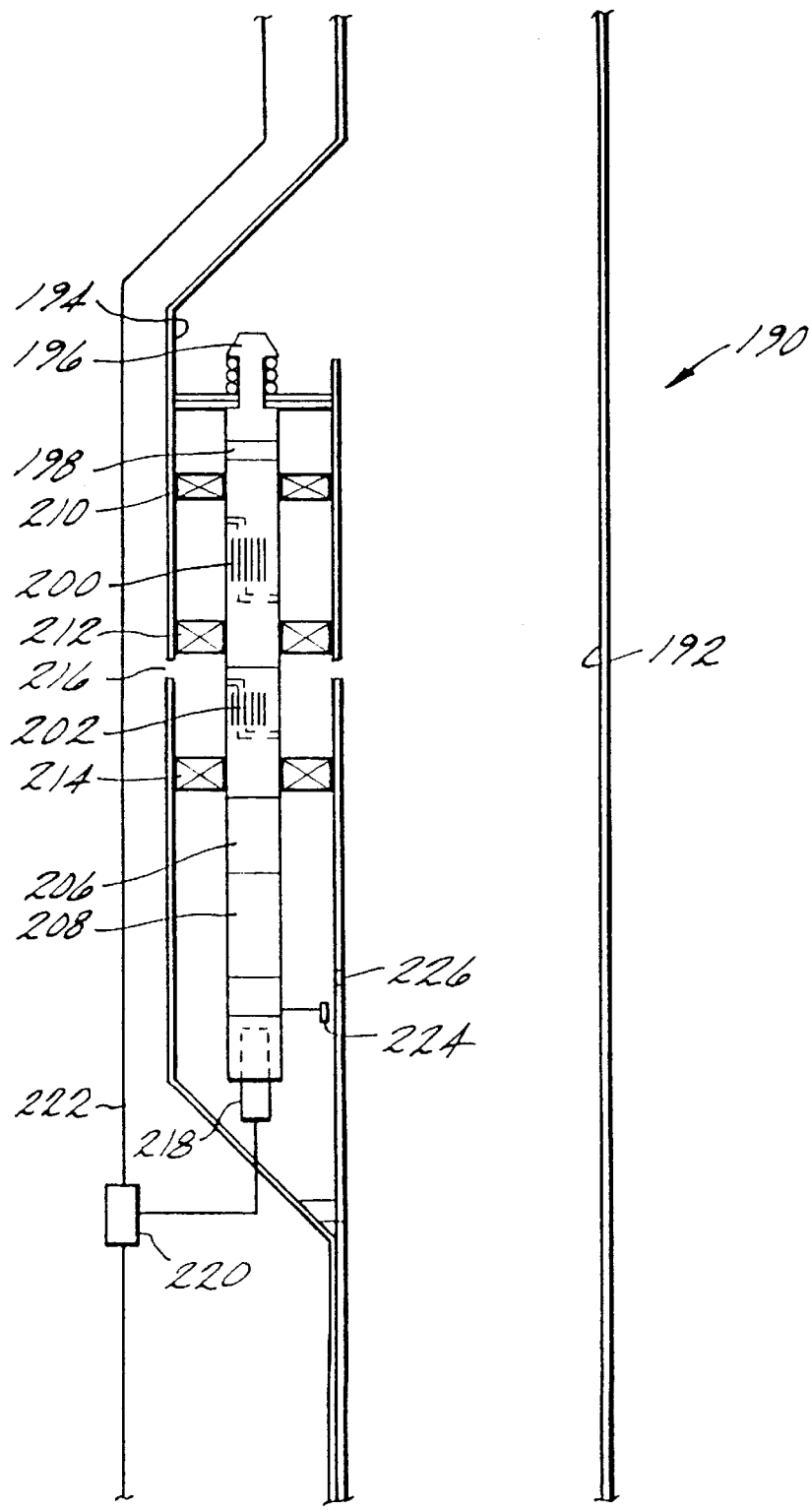
FIG. 12 is a diagrammatic view of a remotely controlled fluid/gas control system.

Referring now to FIG. 12, a remotely controlled fluid/gas control system is shown and includes a side pocket mandrel 190 having a primary bore 192 and a side bore 194. Located within side bore 194 is a removable flow control assembly in accordance with the present invention. This flow control assembly includes a locking device 196 which is attached to a telescopic section 198 followed by a gas regulator section 200, a fluid regulator section 202, a gear section 204 and motor 206. Associated with motor 206 is an electronics control module 208. Three spaced seal sections 210, 212 and 214 retain the flow control assembly within the side bore or side pocket 194. Upon actuation by electronics module 208, control signals are sent to motor 206 which in turn actuate gears 204 and move gas regulator section 200 and fluid regulator section 202 in a linear manner upwardly or downwardly within the side pocket 194. This linear movement will position either the gas regulator section 200 or the fluid regulator section 202 on either side of an inlet port 216.

Preferably, electronics control module 208 is powered and/or data signals are sent thereto via an inductive coupler 218 which is connected via a suitable electrical pressure fitting 220 to the TEC cable 192 of the type discussed above. A pressure transducer 224 senses pressure in the side pocket 194 and communicates the sensed pressure to the electronics control module 208 (which is analogous to downhole module 22). A pressure relief port is provided to side pocket 194 in the area surrounding electronics module 208.

The flow control assembly shown in FIG. 12 provides for regulation of liquid and/or gas flow from the wellbore to the tubing/casing annulus or vice versa. Flow control is exercised by separate fluid and gas flow regulator subsystems within the device. Encoded data/control signals are supplied either externally from the surface or subsurface via a data control path 222 and/or internally via the interaction of the pressure sensors 224 (which are located either upstream or downstream in the tubing conduit and in the annulus) and/or other appropriate sensors together with the on-board microprocessor 208 in a manner discussed above with regard to FIGS. 6 and 7.

The flow control assembly of this invention provides for two unique and distinct subsystems, a respective fluid and gas flow stream regulation. These subsystems are pressure/fluid isolated and are contained with the flow control assembly. Each of the systems is constructed for the specific respective requirements of flow control and resistance to damage, both of which are uniquely different to the two control mediums. Axial reciprocation of the two subsystems, by means of the motor 206 and gear assembly 204 as well as the telescopic section 198 permits positioning of the appropriate fluid or gas flow subsystem in conjunction with the single fluid/gas passages into and out of the side pocket mandrel 190 which serves as the mounting/control platform for the valve system downhole. Both the fluid and gas flow subsystems allow for fixed or adjustable flow rate mechanisms.

The external sensing and control signal inputs are supplied in a preferred embodiment via the encapsulated, insulated single or multiconductor wire 222 which is electrically connected to the inductive coupler system 218 (or alternatively to a mechanical, capacitive or optical connector), the two halves of which are mounted in the lower portion of the side pocket 194 of mandrel 190, and the lower portion of a regulating valve assembly respectively. Internal inputs are supplied from the side pocket 194 and/or the flow control assembly. All signal inputs (both external and internal) are supplied to the on-board computerized controller 208 for all processing and distributive control. In addition to processing of off boards inputs, an ability for on-board storage and manipulation of encoded electronic operational "models" constitutes one application of the present invention providing for autonomous optimization of many parameters, including supply gas utilization, fluid production, annulus to tubing flow and the like.

The remotely controlled fluid/gas control system of this invention eliminates known prior art designs for gas lift valves which forces fluid flow through gas regulator systems. This results in prolonged life and eliminates premature failure due to fluid flow off the gas regulation system. Still another feature of this invention is the ability to provide separately adjustable flow rate control of both gas and liquid in the single valve. Also, remote actuation, control and/or adjustment of downhole flow regulator is provided by this invention. Still another feature of this invention is the selected implementation of two devices within one side pocket mandrel by axial manipulation/displacement as described above. Still another feature of this invention is the use of a motor driven, inductively coupled device in a side pocket. The device of this invention reduces total quantity of circulating devices in a gas lift well by prolonging circulating mechanism life. As mentioned, an important feature of this invention is the use of a microprocessor 208 in conjunction with a downhole gas lift/regulation device as well as the use of a microprocessor in conjunction with a downhole liquid flow control device.

Remotely Controlled Variable Choke and Shut-Off Valve System

Figure 13:
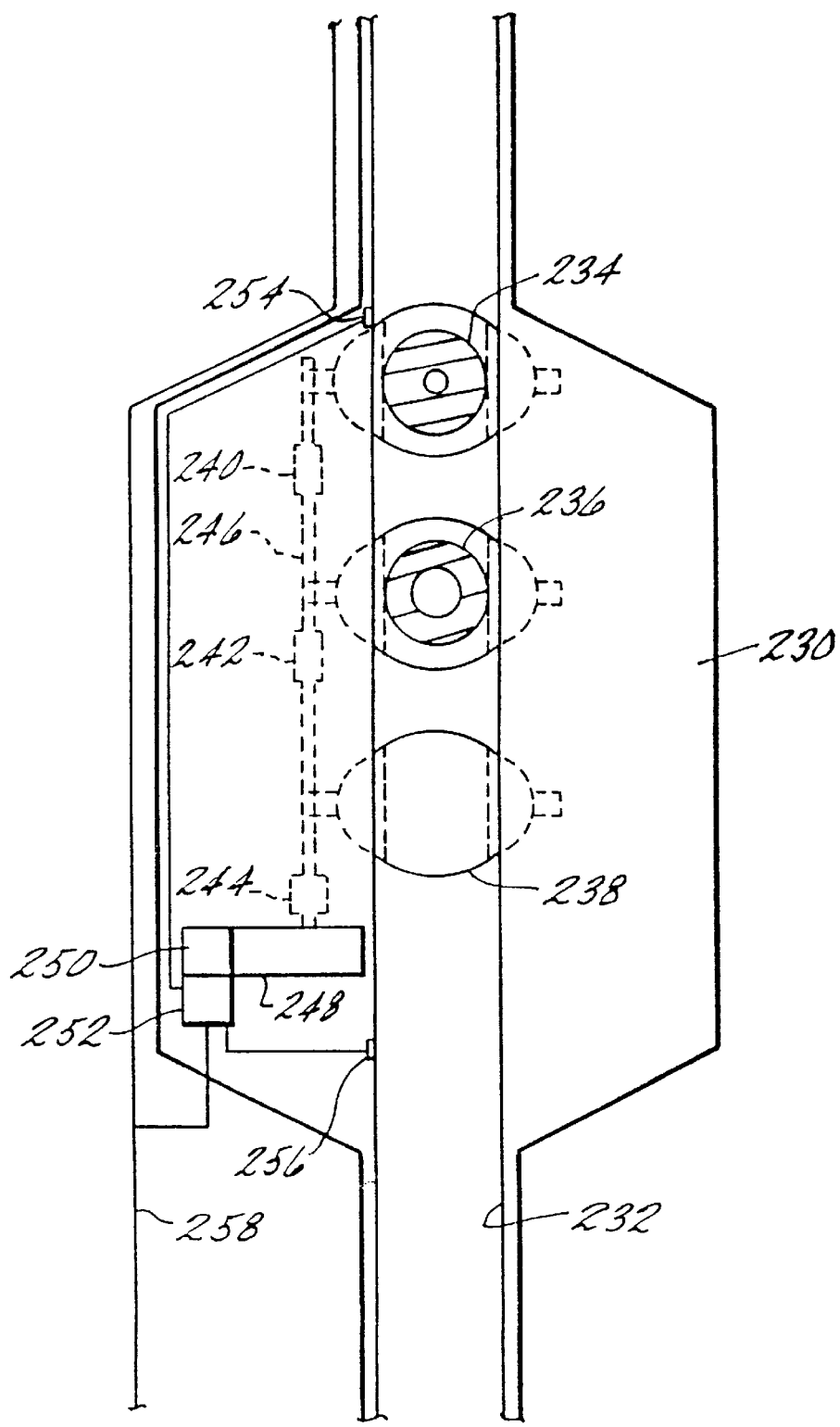
FIG. 13 is a diagrammatic view of a remotely controlled shut off valve and variable choke assembly.

Referring to FIG. 13, a remotely controlled downhole device is shown which provides for actuation of a variable downhole choke and positively seals off the wellbore above from downhole well pressure. This variable choke and shut-off valve system is subject to actuation from the surface, autonomously or interactively with other intelligent downhole tools in response to changing downhole conditions without the need for physical reentry of the wellbore to position a choke. This system may also be automatically controlled downhole as discussed with regard to FIGS. 6 and 7. As will be discussed hereinafter, this system contains pressure sensors upstream and downstream of the choke/valve members and real time monitoring of the response of the well allows for a continuous adjustment of choke combination to achieve the desired wellbore pressure parameters. The choke body members are actuated selectively and sequentially, thus providing for wireline replacement of choke orifices if necessary.

Turning to FIG. 13, the variable choke and shut off valve system of this invention includes a housing 230 having an axial opening 232 therethrough. Within axial opening 232 are a series (in this case two) of ball valve chokes 234 and 236 which are capable of being actuated to provide sequentially smaller apertures; for example, the aperture in ball valve choke 234 is smaller than the relatively larger aperture in ball valve choke 236. A shut-off valve 238, may be completely shut off to provide a full bore flow position through axial opening 232. Each ball valve choke 234 and 236 and shut-off valve 238 are releasably engageable to an engaging gear 240, 242 and 244, respectively. These engaging gears are attached to a threaded drive shaft 246 and drive shaft 246 is attached to appropriate motor gearing 248 which in turn is attached to stepper motor 250. A computerized electronic controller 252 provides actuation control signals to stepper motor 250. Downhole controller 252 communicates with a pair of pressure transducers, one transducer 254 being located upstream of the ball valve chokes and a second pressure transducer 256 being located downstream of the ball valve chokes. Microprocessor controller 252 can communicate with the surface either by wireless means of the type described in detail above or, as shown in FIG. 13 by hard wired means such as the power/data supply cable 258 which is preferably of the TEC type described above.

As shown in FIG. 13, the ball valve chokes are positioned in a stacked configuration within the system and are sequentially actuated by the control rotation mechanism of the stepper motor, motor gearing and threaded drive shaft. Each ball valve choke is configured to have two functional positions: an "open" position with a fully open bore and an "actuated" position where the choke bore or closure valve is introduced into the wellbore axis. Each member rotates 90° pivoting about its respective central axis into each of the two functional positions. Rotation of each of the members is accomplished by actuation of the stepper motor which actuates the motor gearing which in turn drives the threaded drive shaft 246 such that the engaging gears 240, 242 or 244 will engage a respective ball valve choke 234 or 236 or shut-off valve 238. Actuation by the electronic controller 252 may be based, in part upon readings from pressure transducers 254 and 256 or by a control signal from the surface.

The variable choke and shut-off valve system of the present invention provides important features and advantages including a novel means for the selective actuation of a downhole adjustable choke as well as a novel means for installation of multiple, remotely or interactively controlled downhole chokes and shut-off valves to provide tuned/optimized wellbore performance.

Figures 15, 16:
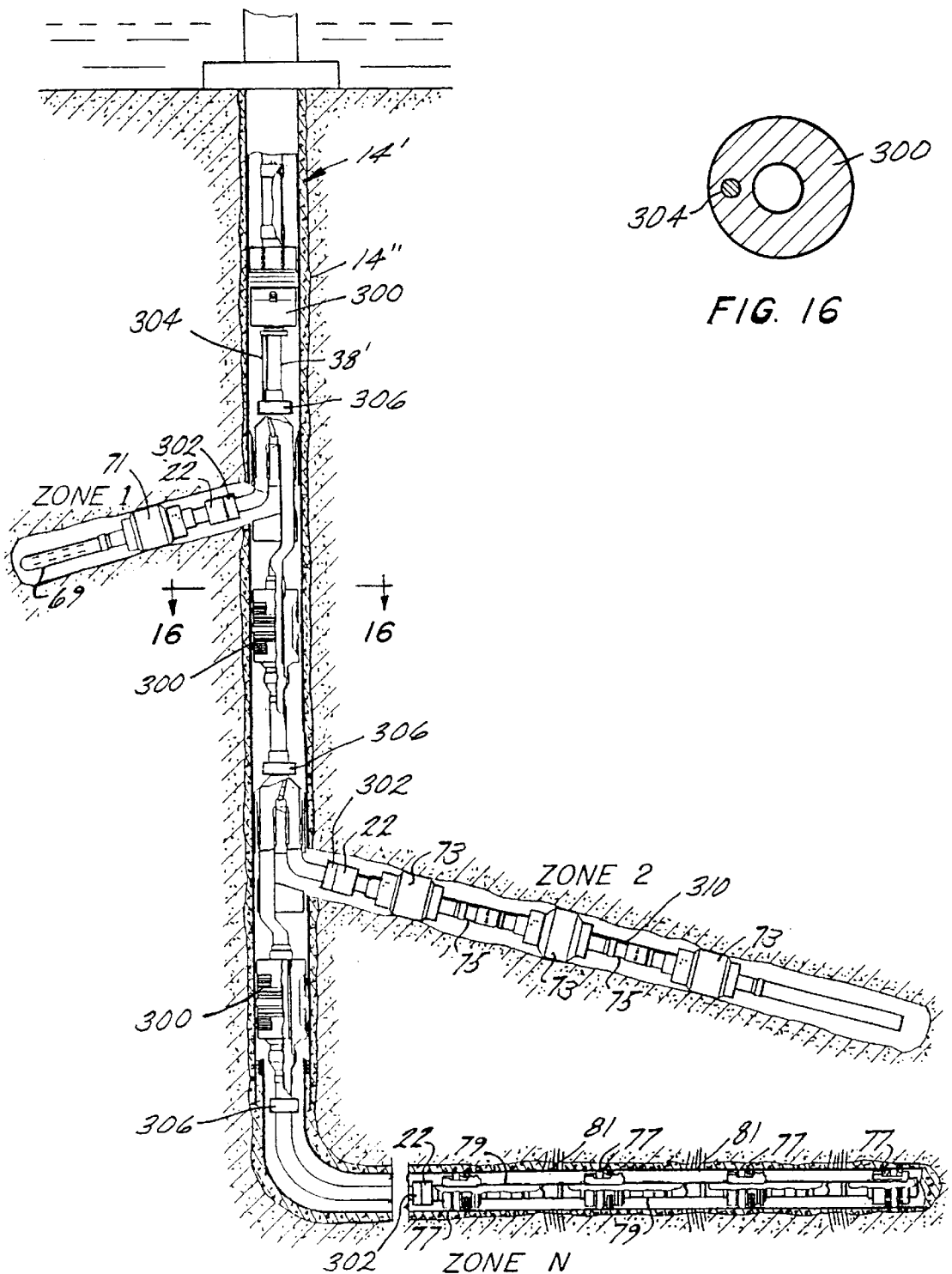
FIG. 15 is a diagrammatic view of a portion of FIG. 1 depicting a selected well and selected zones in such selected well with a downhole control system and communication and/or power transmission system for use therewith.
FIG. 16 is a sectional view taken along the line 16—16 in FIG. 15.

Referring now to FIGS. 15 and 16, a completed well 14' is shown with a production tubing string 38' therein, as discussed hereinbefore. Well 14' is a multilateral well having a main (or primary) borehole 14" with multiple branches (or laterals), designated zones 1–N. Viewed another way, well 14' can be thought of as having multiple zones with for example, a first zone corresponding to a primary well and a second zone corresponding to a lateral well. Alternatively, each zone maybe in the same borehole but representent distinct production zones. String 38' in the main borehole 14" includes packers 300 located uphole and downhole from each of the zones. Also has described hereinbefore, each zone includes a downhole control system 22. In zone 1, a slotted liner completion is shown at 69 associated with a packer 71. In zone 2, an open hole completion is shown with a series of packers 73 and intermittent sliding sleeves 75. In zone N, a cased hole completion is shown again with the series of packers 77, sliding sleeve 79 and perforating tools 81. The control system 22 in zone 1 includes electromechanical drivers and electromechanical devices which control the packers 69 and valving associated with the slotted liner so as to control fluid flow. Similarly, control system 22 in zone 2 include electromechanical drivers and electromechanical devices which control the packers, sliding sleeves and valves associated with that open hole completion system. The control system 22 in zone N also includes electromechanical drivers and electromechanical control devices for controlling the packers, sliding sleeves and perforating equipment depicted therein.

An acoustic or electromagnetic transceiver 302 is associated with each control system 22 for communication and/or transmission of power. An electrical (or optical) conductor 304 runs from the surface downhole along string 38' in the main borehole 14" for communication and/or transmission of power, hardwired systems are well known, e.g., see U.S. Pat. Nos. 3,879,097, 3,918,537 and 4,215,426. Preferrably, only a single cable 304 is used to transmit communication and/or power. This single cable is particularly advantangeous in that space constraints often preclude a multi-cable system architect. In an exemplary embodiment, conductor 304 is ¼" TEC cable which is a power conduit disposed within a steel sleeve and isolated therefrom by epoxy material. Conductor 304 is connected to an acoustic or electromagnetic transceiver 306 disposed at string 38' near each branch for transducing the signals from one domain to the other. Transceivers 306 communicate with and/or transfer power to corresponding transceivers 302 at the branches (i.e., short hop communications), which is communicated and/or transferred along string 38' on conductor 304 (i.e., uphole or downhole).

With acoustic transceivers (transmitter and/or receiver) acoustic or seismic signals travel through the production string, borehole fluid or the earth. The acoustic transmitter/receiver may be of the type described in any one of U.S. Pat. Nos. 4,375,239, 4,347,900, 4,378,850, 5,148,408, 5,050, 132, 5,056,067, 5,124,953, 5,128,901, 5,128,902, 5,148,408 and 5,222,049, all of which are expressly incorporated herein by reference. Several of the above acoustic transmitter/receiver assemblies are described hereinbefore. Further, another example of an acoustic telemetering system is Cameron Iron Works' CAMSMART downhole measurement system, as published in the Houston Chronicle on May 7, 1990, page 3B.

With electromagnetic transceivers (transmitter and/or receiver) electromagnetic ("EM") waves through the production string, borehole fluid and the earth. Typically, a pickup assembly or loop antenna (e.g. a toroid) is located around the string. As is well known in the art, the toriod includes a core and an electrical conductor wrapped around the core. The core is preferably comprised of a highly permeable material, such as an iron/nickel alloy. An electrical conductor is wound about the core to form the coils of the antenna (i.e., the toroid). Electronics are for providing transmitting signals to and/or receiving signals from the antenna. An electric field generated by the toroid couples a current into the production string. Alternatively, an electric field applied across an insulating joint as a source, may be used to generate a current in the production string (i.e., direct-coupled), as is know in the art. The EM transmitter/receiver may be of the type described in any one of U.S. Pat. Nos. 2,354,887, 3,967,201, 4,215,426, 4,302,757, 4,348, 672, 4,387,372, 4,684,946, 4,691,203, 4,710,708, 4,725,837, 4,739,325, 4,766,442, 4,800,385, 4,839,644 and 5,160,925, all of which are expressly incorporated herein by reference. The short hop EM transmitter/receiver described in U.S. Pat. No. 5,160,925 is preferred in the present invention, as the signals are only required to travel short distances, whereby the large power requirement systems designed for transmission over long distances (several thousand feet) are not required.

Communication and/or transmission of power along the laterals can be accomplished, by way of, a hardwire, optical cable, acoustic transmission, electromagnetic transmission or any other suitable method. By way of example only, zone 2 is shown (FIG. 15) with an electrical conductor 310 running from the controller 22 along the lateral string for communication with and/or transmission of power to the electromechanical drivers and electromechanical devices which control the packers, sliding sleeves and valves associated with that open hole completion system.

With power signals the receiver is a transducer adapted for converting the EM signals to electrical signals suitable for powering downhole devices or charging downhole batteries.

While preferred embodiments have been shown and described, modifications and substitutions may be made thereto without departing from the spirit and scope of the invention. Accordingly, it is to be understood that the present invention has been described by way of illustrations and not limitation.

What is claimed is:

1. A system for telemetering signals in a production well between a first completed zone and a second completed zone, comprising:
    a cable disposed in said first completed zone for telemetering signals in said first completed zone;
    a data gathering device disposed in said second completed zone; and
    a data transmission device in communication with said cable, said data transmission device being disposed in said first completed zone near said second completed zone for transducing said signals between said data gathering device and said data transmission device within the well to provide direct communication between said data gathering device and said data transmission device wherein said signals comprise communication signals and wherein said data transmission and data gathering devices are discrete devices relative to one another.

2. The system of claim 1 wherein said well includes a primary well and at least one lateral well and wherein:
    said first zone is located in said primary well and said second zone is located in said lateral well.

3. The system of claim 2 further comprising:
    a lateral cable disposed in said lateral well for telemetering said signals in said lateral well, said data gathering device transducing said signals between said data gathering device and said lateral cable.

4. The system of claim 1 wherein said cable comprises a wire for electrically telemetering said signals in said first zone.

5. The system of claim 3 wherein said lateral cable comprises a wire for electrically telemetering said signals in said lateral well.

6. The system of claim 1 wherein said cable comprises an optical cable for optically telemetering said signals in said first zone.

7. The system of claim 3 wherein said lateral cable comprises an optical cable for optically telemetering said signals in said lateral well.

8. The system of claim 1 wherein each of said data gathering and data transmission devices comprise at least one of an electromagnetic receiver and an electromagnetic transmitter.

9. The system of claim 1 wherein each of said data gathering and data transmission devices comprise an antenna.

10. The system of claim 1 wherein said communication signals comprise at least one of data signals and command signals.

11. The system of claim 1 wherein each of said data gathering and data transmission devices comprise at least one of an acoustic receiver and an acoustic transmitter.

12. The system of claim 11 wherein each of said data gathering and data transmission devices comprise a stack of piezoelectric elements or magnetorestrictive elements.

13. The system of claim 1 including production tubing extending between said first and second zones and wherein said production tubing comprises a medium for acoustically transducing said signals.

14. A method of telemetering signals in a production well having a first completed zone and at least one second completed zone, comprising:
    transducing signals between a data gathering device disposed in said second completed zone near said first completed zone and a data transmission device in said first completed zone, said data transmission device being in communication with a cable disposed in said first completed zone; and
    telemetering signals using said cable disposed in said first completed zone wherein such telemetering of said signals within said well is directly between said data gathering device and said data transmission device and wherein said signals comprise communication signals and wherein said data gathering and data transmission devices are discrete devices relative to one another.

15. The method of claim 14 wherein said well includes a primary well and at least one lateral well and wherein:
    said first zone is located in said primary well and said second zone is located in said lateral well.

16. The method of claim 15 wherein telemetering said signals using said cable comprises:
    electrically telemetering said signals using said cable.

17. The method of claim 15 wherein said telemetering said signals using said cable comprises:
    optically telemetering said signals using said cable.

18. The method of claim 15 wherein said communication signals comprise at least one of data signals and command signals.

19. The method of claim 15 wherein said transducing of said signals comprises acoustic transducing of said signals.

20. The method of claim 15 wherein said tranducing of said signals comprises electromagnetically transducing of said signals.

* * * * *

UNITED STATES PATENT AND TRADEMARK OFFICE
CERTIFICATE OF CORRECTION

PATENT NO. : 6,192,988 B1
DATED : February 27, 2001
INVENTOR(S) : Paulo Tubel

It is certified that error appears in the above-identified patent and that said Letters Patent is hereby corrected as shown below:

Title page,
Item [57], ABSTRACT,
Line 4, before "a" delete "having" and insert therefor -- has --

Column 7,
Line 9, after "tool)" delete "then" and insert therefor -- than --
Line 13, after "and" delete "transmitts" and insert therefor -- transmits --
Line 20, after "electromagnetic" delete "transciever" and insert therefor -- transceiver --
Line 38, after "a" delete "toriod" and insert therefor -- toroid --

Column 10,
Line 23, after "operated" delete "form" and insert therefor -- from --

Column 11,
Line 6, after "which" delete "is" and insert therefor -- are --

Column 12,
Line 15, after "downhole" delete "electronics" and insert therefor -- control system --
Line 26, after "30" delete "seconds" and insert therefor -- second --
Line 67, after "acquisition" delete "sensor" and insert therefor -- system --

Column 13,
Lines 41 and 42, after "as" delete "remote location" and insert therefor
-- control center --
Line 46, after "The" delete "remote computer" and insert therefor -- control center --
Lines 47 and 48, after "control" delete "modules"
Line 62, after "control" delete "modules" and insert therefor -- system --

Column 14,
Line 2, after "control" delete "sensor" and insert therefor -- center --
Lines 7 and 8, after "control" delete "system" and insert therefor -- center --
Line 44, after "store" delete "at"

Column 15,
Line 44, after "for" delete "a" and insert therefor -- an --

UNITED STATES PATENT AND TRADEMARK OFFICE
CERTIFICATE OF CORRECTION

PATENT NO. : 6,192,988 B1
DATED : February 27, 2001
INVENTOR(S) : Paulo Tubel

It is certified that error appears in the above-identified patent and that said Letters Patent is hereby corrected as shown below:

Column 16,
Lines 16 and 17, after "recorder" delete "66" and insert therefor -- 66A --

Column 17,
Line 15, after "drivers" delete "70" and insert therefor -- 60 --
Line 23, before "70" delete "controller" and insert therefor -- processor --
Line 30, after "Micro" delete "controller" and insert therefor -- porocessor --

Column 18,
Line 1, after "packers" delete "69" and insert therefor -- 71 --
Line 3, after "2" delete "include" and insert therefor -- includes --

Column 19,
Line 33, after "receivers" delete "286" and insert therefor -- 290 --

Column 22,
Line 6, after "with" delete "gauge" and insert therefor -- sensor --
Line 9, after "of" delete "gauge" and insert therefor -- sensor --
Line 9, after "cable" delete "92" and insert therefor -- 98 --

Column 23,
Line 11, after "other" delete "sensor" and insert therefor -- pocket --
Line 19, after "monitoring" delete "device" and insert therefor -- sensor --
Line 57, after "cut" insert -- , --

Column 28,
Line 20, after "flow" delete "off" and insert therefor -- of --
Line 33, after "a" delete "microprocessor" and insert therefor -- module --

Column 29,
Line 47, after "zone" delete "maybe" and insert therefor -- may be --
Line 47, after "but" delete "representent" and insert therefor -- represent --
Line 50, after "Also" delete "has" and insert -- as --
Line 59, after "the" (first occurrence) delete "packers" and insert therefor -- liners --
Line 61, after "2" delete "include" and insert therefor -- includes --

UNITED STATES PATENT AND TRADEMARK OFFICE
CERTIFICATE OF CORRECTION

PATENT NO.    : 6,192,988 B1
DATED         : February 27, 2001
INVENTOR(S)   : Paulo Tubel It is certified that error appears in the above-identified patent and that said Letters Patent is hereby corrected as shown below:

Column 30,
Line 8, after "only" delete "a single cable" and insert therefor -- conductor --
Line 30, after "described" delete "herein before" and insert therefor -- hereinabove --
Line 36, after "waves" insert -- pass --
Line 39, after "the" (third occurrence) delete "toriod" and insert therefor -- toroid --

Column 32,
Line 53, after "said" delete "tranducing" and insert therefor -- transducing --

Signed and Sealed this

Twelfth Day of April, 2005

JON W. DUDAS
*Director of the United States Patent and Trademark Office*